Figure 1:
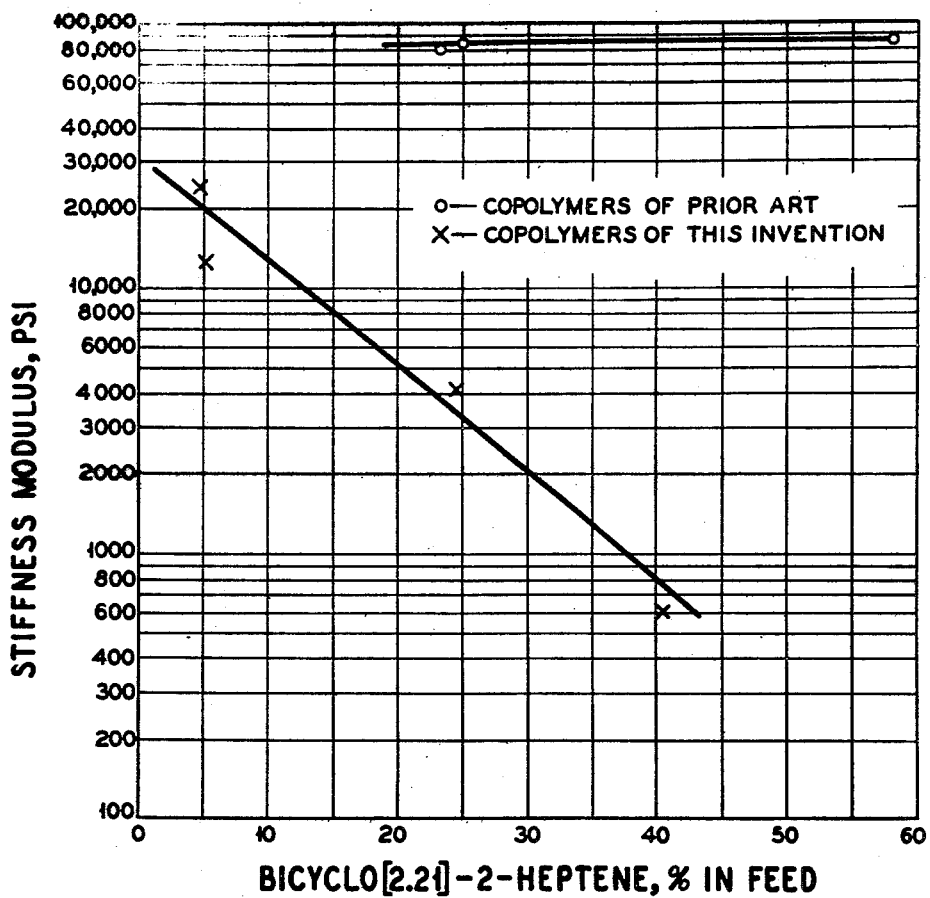

INVENTORS
FREDERICK P. REDING
PAUL S. STARCHER
EDGAR W. WISE

BY Francis M. Fazio
ATTORNEY

INVENTORS
FREDERICK P. REDING
PAUL S. STARCHER
EDGAR W. WISE

BY Francis M. Fazio
ATTORNEY

United States Patent Office 3,494,897
Patented Feb. 10, 1970

3,494,897
ETHYLENE/BICYCLO[2.2.1]HEPT-2-ENE COPOLYMERS
Frederick P. Reding, Brussels, Belgium, and Paul S. Starcher and Edgar W. Wise, Charleston, W. Va., assignors to Union Carbide Corporation, a corporation of New York
Continuation-in-part of applications Ser. No. 167,751, Ser. No. 167,752, Ser. No. 167,964, and Ser. No. 167,965, Jan. 22, 1962. This application Dec. 5, 1963, Ser. No. 328,354
Int. Cl. C08f *17/00*
U.S. Cl. 260—78.5
97 Claims This application is a continuation-in-part of applicants' copending applications Ser. No. 167,751, "Copolymers"; Ser. No. 167,752, "Ethylene Copolymers"; Ser. No. 167,964, "Copolymers of Ethylene"; and Ser. No. 167,965, "Ethylene/Substituted Bicyclo[2.2.1]Hept-2-ene Copolymers"; all of said applications having been filed on Jan. 22, 1962, all of the above applications are now abandoned.

This invention relates to copolymers of ethylene and bicyclo[2.2.1]hept-2-ene compounds and to processes for their production.

Polymers of bicyclo[2.2.1]hept-2-ene are known and are disclosed in U.S. Patents 2,721,189 and 2,932,630. Structure studies of the solid polymers of these patents has established that during the polymerization the bicyclo-[2.2.1]hept-2-ene underwent ring scission with the formation of a polymer consisting of recurring cyclopentanyl-vinylene units of the structure:

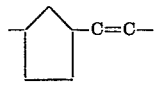

These polymers are produced using as catalyst a coordination complex of a titanium compound in which the titanium has been reduced to a valence state below 3 with a reducing compound.

Related to the designated patents is U.S. Patent 2,799,668, which is directed to interpolymers of ethylene with bicyclo[2.2.1]hept-2-ene or its 1- and/or 5-hydrocarbon-substituted derivatives. These interpolymers are also produced by means of catalyst complexes similar to those disclosed in the previously designated patents. In addition, British Patent 777,414 is known, which is the British counterpart of U.S. Patent 2,721,189 and U.S. Patent 2,799,668; and British Patent 828,563, which is the British counterpart of U.S. Patent 2,932,630. From a reading of all of the references together, it is obvious, since the same class of catalysts is used in all cases, that in all instances the homopolymers and copolymers produced by the prior art processes, and known to date, all contain the recurring cyclopentanylvinylene unit in the polymer chain.

It has now been found that high molecular weight copolymers of ethylene and bicyclo[2.2.1]hept-2-ene compounds can be produced which are structurally and chemically different from the bicyclo[2.2.1]hept-2-ene polymers heretofore known. The novel copolymers of this invention contain in the polymer chain unsubstituted or substituted bicycloheptanylene units of the formula:

and —$CH_2CH_2$— units.

The novel copolymers of this invention can be used to produce films, fibers, and nets; as insulation for electrical conductors; to produce molded and extruded shaped articles; and as protective coverings.

In the process of the instant invention, a mixture of ethylene and the bicyclo[2.2.1]hept-2-ene compound is polymerized at a pressure of at least 500 atmospheres and a temperature above about 40° C. in the presence of a free radical catalyst. The processes can be carried out in a continuous manner or in a batchwise manner; and they can be bulk, solution, emulsion, or suspension processes.

In many instances the polymers of this invention cannot be produced with the co-ordination type catalysts heretofore used since functional groups attached to the bicycloheptene nucleus of the comonomer would destroy the catalytic activity of such catalysts. Therefore, the polymers can be produced only by the processes herein disclosed. The processes of this invention produce copolymers ranging from liquid to solid products, including the elastomeric types.

Among the substituted bicyclo[2.2.1]hept-2-enes which are copolymerized with ethylene are those represented by the generic formula:

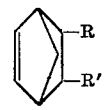

(I)

where R, when taken singly, represents a hydrogen atom, an alkyl group containing from 1 to about 18 carbon atoms, a phenyl group, or an R' group; R', when taken singly, represents a functional Z group, a Z-substituted cycloalkyl group containing from 4 to 7 carbon atoms in the cycloalkyl ring or a Z-substituted alkyl group wherein the alkyl group contains up to 12 carbon atoms, said R' containing not more than two functional Z groups as hereinafter defined and not more than 22 carbon atoms therein; and R and R', when taken jointly, form a three-membered heterocyclic divalent group attached to the bicyclo moiety, said divalent group containing carbon and not more than two hetero atoms from the group of oxygen, nitrogen, and sulfur.

The substituted bicyclo[2.2.1]hept-2-enes subgeneric to Formula I are member of the following three classes:

Class 2

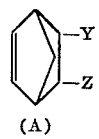   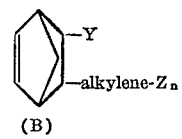

(A)                (B)

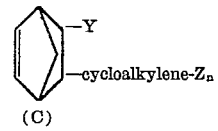

(C)

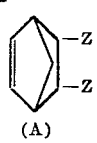   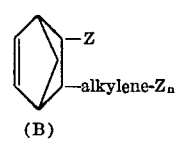

(A)                (B)

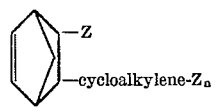   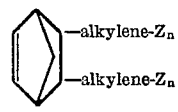

(C)                (D)

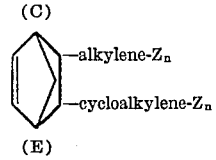   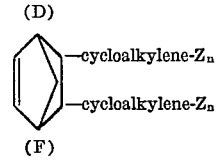

(E)                (F)

Class 3

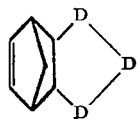

In the above formulae Y is a hydrogen atom, an alkyl group containing from 1 to about 18 carbon atoms, or phenyl; the alkylene radical contains from 1 to about 12 carbon atoms; the cycloalkylene radical contains from 4 to 7 ring carbon atoms; Z is a functional group as defined below; $n$ is an integer having a value of 1 or 2; and D represents the elements carbon, oxygen, nitrogen, or sulfur and at least one and not more than two of said D atoms must be a carbon atom.

The Z substituent on the bicyclo[2.2.1]hept-2-ene derivatives can be (a) a halogen atom (chlorine, bromine, fluorine, and iodine), (b) an —OR''' group, (c) a cyano group, (d) an isocyanato group, (e) an —OR'''' group wherein R'' is an alkyl group containing from 1 to about 18 carbon atoms, a halogen atom and an —NH$_2$ group, (f) an —NR$_2$''' group wherein R''' is a hydrogen atom, an alkyl group containing from 1 to about 18 carbon atoms, or a cycloalkyl group containing from 4 to 7 ring carbon atoms, (g) a —CONR$_2$''' group, (h) a —COOR''' group, (i) a —COX group wherein X is a halogen atom and an alkyl group containing from 1 to about 10 carbon atoms, (j) an acetal group —CH(OR'''')$_2$ wherein R'''' is an alkyl group containing from 1 to about 10 carbon atoms, (k) an —SR'''',

and

group, (l) an

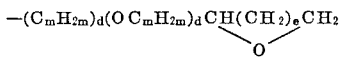

group wherein $m$ is an integer having a value of from 1 to about 4, $d$ is an integer having a value of 0 and 1, and $e$ is an integer having a value of from 0 to 2, and ($m$) an

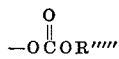

group wherein R''''' is an alkyl group containing 1 to 10 carbon atoms or phenyl. It has been found that other functional groups can also be present, for example, the sulfite ester and the like groups, and it is our intension to include all sutiable functional groups within the scope of this invention.

As previously indicated, the D variables of the cmopounds of Class 3 represent the elements carbon oxygen, nitrogen, or sulfur and that at least one and not more than two of said D variables must be a carbon atom. Among some of the divalent units represented by the divalent

unit making up the heterocyclic ring can mention the following:

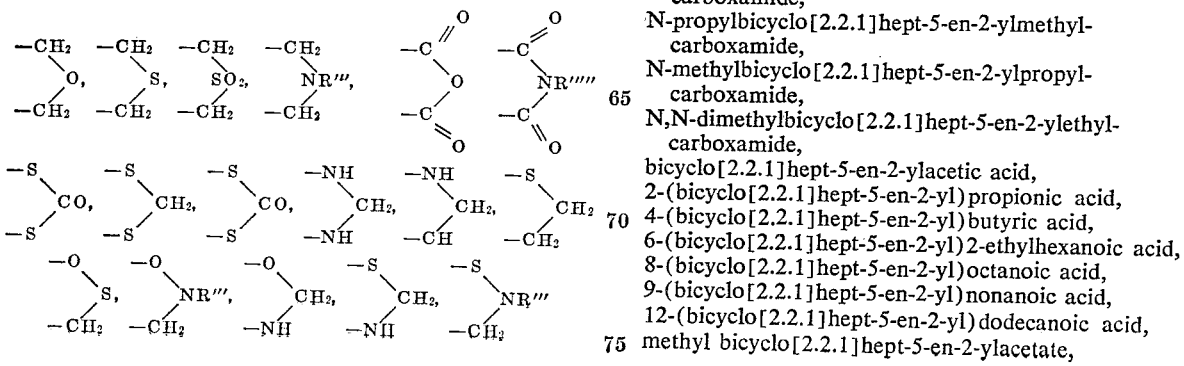

and so forth, wherein R''''' is a —C$_m$H$_{2m}$T group in which T is a hydrogen atom, a halogen atom, an OR''' group, a cyano group, or an —NR'''$_2$ group.

These bicyclo[2.2.1]hept-2-ene compounds polymerize to produce units of the formula:

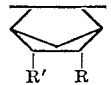

in the polymer chain. Illustrative of the substituted bicyclo(2.2.1]hept-2-enes corresponding to generic Formula I which can be used one can mention:
5-chlorobicyclo[2.2.1]hept-2-ene,
5-bromobicyclo[2.2.1]hept-2-ene,
5-iodobicyclo[2.2.1]hept-2-ene,
5-fluorobicyclo[2.2.1]hept-2-ene,
5-hydroxybicyclo[2.2.1]hept-2-ene,
5-cyanobicyclo[2.2.1]hept-2-ene,
5-aminobicyclo[2.2.1]hept-2-ene,
5-N-methylaminobicyclo[2.2.1]hept-2-ene,
bicyclo[2.2.1]hept-5-en-2-yl acetate,
bicyclo[2.2.1]hept-5-en-2-yl propionate,
bicyclo[2.2.1]hept-5-en-2-yl pentanoate,
5-isocyanatobicyclo[2.2.1]hept-2-ene,
5-carboxybicyclo[2.2.1]hept-2-ene,
ethyl bicyclo[2.2.1]hept-2-en-5-carboxylate,
butyl bicyclo[2.2.1]hept-2-en-5-carboxylate,
bicyclo[2.2.1]hept-2-en-5-carboxamide,
N-methylbicyclo[2.2.1]hept-2-en-5-carboxamide,
N,N-dimethylbicyclo[2.2.1]hept-2-en-5-carboxamide,
N-propylbicyclo[2.2.1]hept-2-en-5-carboxamide
N,N-dibutylbicyclo[2.2.1]hept-2-en-5-carboxamide,
5-epoxyethylbicyclo[2.2.1]hept-2-ene,
5-chloromethylbicyclo[2.2.1]hept-2-ene,
5-bromopropylbicyclo[2.2.1]hept-2-ene,
5-chlorodecylbicyclo[2.2.1]hept-2-ene,
5-hydroxymethylbicyclo[2.2.1]hept-2-ene,
5-hydroxybutylbicyclo[2.2.1]hept-2-ene,
5-cyanoethylbicyclo[2.2.1]hept-2-ene,
5-cyanopentylbicyclo[2.2.1]hept-2-ene,
5-isocyanatobutylbicyclo[2.2.1]hept-2-ene,
5-aminomethylbicyclo[2.2.1]hept-2-ene,
5-aminoheptylbicyclo[2.2.1]hept-2-ene,
5-N-methylaminomethylbicyclo[2.2.1]hept-2-ene,
5-N,N-dimethylaminoethylbicyclo[2.2.1]hept-2-ene,
5-N,N-dipropylaminobutylbicyclo[2.2.1]hept-2-ene,
bicyclo[2.2.1]hept-5-en-2-ylmethyl acetate,
bicyclo[2.2.1]hept-5-en-2-yl-n-butyl acetate,
bicyclo[2.2.1]hept-5-en-2-yldecyl acetate,
bicyclo[2.2.1]hept-5-en-2-ylmethyl butyrate,
bicyclo[2.2.1]hept-5-en-2-ylmethyl chloroformate,
bicyclo[2.2.1]hept-5-en-2-ylmethyl bromoformate,
bicyclo[2.2.1]hept-5-en-2-ylmethyl carbamate,
bicyclo[2.2.1]hept-5-en-2-ylpropyl carbamate,
bicyclo[2.2.1]hept-5-en-2-ylmethylcarboxamide,
bicyclo[2.2.1]hept-5-en-2-ylethylcarboxamide,
bicyclo[2.2.1]hept-5-en-2-ylbutylcarboxamide,
N-methylbicyclo[2.2.1]hept-5-en-2-ylmethyl-
  carboxamide,
N,N-dimethylbicyclo[2.2.1]hept-5-en-2-ylmethyl-
  carboxamide,
N-propylbicyclo[2.2.1]hept-5-en-2-ylmethyl-
  carboxamide,
N-methylbicyclo[2.2.1]hept-5-en-2-ylpropyl-
  carboxamide,
N,N-dimethylbicyclo[2.2.1]hept-5-en-2-ylethyl-
  carboxamide,
bicyclo[2.2.1]hept-5-en-2-ylacetic acid,
2-(bicyclo[2.2.1]hept-5-en-2-yl)propionic acid,
4-(bicyclo[2.2.1]hept-5-en-2-yl)butyric acid,
6-(bicyclo[2.2.1]hept-5-en-2-yl)2-ethylhexanoic acid,
8-(bicyclo[2.2.1]hept-5-en-2-yl)octanoic acid,
9-(bicyclo[2.2.1]hept-5-en-2-yl)nonanoic acid,
12-(bicyclo[2.2.1]hept-5-en-2-yl)dodecanoic acid,
methyl bicyclo[2.2.1]hept-5-en-2-ylacetate, isopropyl 3-(bicyclo[2.2.1]hept-5-en-2-yl)propionate,
butyl 5-(bicyclo[2.2.1]hept-5-en-2-yl)pentanoate,
ethyl 9-(bicyclo[2.2.1]hept-5-en-yl)nonanoate,
5-(3,4-epoxybutyl)bicyclo[2.2.1]hept-2-ene,
bicyclo[2.2.1]hept-5-en-2-methyl glycidyl ether,
5,6-dichlorobicyclo[2.2.1]hept-2-ene,
5-chloro-6-cyanobicyclo[2.2.1]hept-2-ene,
5,6-dihydroxybicyclo[2.2.1]hept-2-ene,
5,6-dicyanobicyclo[2.2.1]hept-2-ene,
5-chloro-6-isocyanatobicyclo[2.2.1]hept-2-ene,
5,6-dicarboxybicyclo[2.2.1]hept-2-ene,
diethyl bicyclo[2.2.1]hept-5-en-2,3-dicarboxylate,
diisopropyl bicyclo[2.2.1]hept-5-en-2,3-dicarboxylate,
bicyclo[2.2.1]hept-5-en-2,3-ylene diacetate,
bicyclo[2.2.1]hept-5-en-2,3-ylene dibutyrate,
5,6-diaminobicyclo[2.2.1]hept-2-ene,
5-methylamino-6-aminobicyclo[2.2.1]hept-2-ene,
5-dimethylamino-6-aminobicyclo[2.2.1]hept-2-ene,
5-dimethylamino-6-methylaminobicyclo[2.2.1]
  hept-2-ene,
5,6-di-(diethylamino)bicyclo[2.2.1]hept-2-ene,
bicyclo[2.2.1]hept-5-en-2,3-dicarboxamide,
N-methylbicyclo[2.2.1]hept-5-en-2,3-dicarboxamide,
N,N-dimethylbicyclo[2.2.1]hept-5-en-
  2,3-dicarboxamide,
N,N'-dimethylbicyclo[2.2.1]hept-5-en-
  2,3-dicarboxamide,
N,N,N'-trimethylbicyclo[2.2.1]hept-5-en-
  2,3-dicarboxamide,
N,N,N',N'-tetramethylbicyclo[2.2.1]hept-5-en-
  2,3-dicarboxamide,
N-butylbicyclo[2.2.1]hept-5-en-2,3-dicarboxamide,
5,6-diepoxyethylbicyclo[2.2.1]hept-2-ene,
5,6-di-(chloroethyl)-bicyclo[2.2.1]hept-2-ene,
5,6-di-(bromobutyl)-bicyclo[2.2.1]hept-2-ene,
5,6-di-(chlorononyl)-bicyclo[2.2.1]hept-2-ene,
5,6-di-(hydroxypropyl)-bicyclo[2.2.1]hept-2-ene,
5,6-di-(cyanomethyl)-bicyclo[2.2.1]hept-2-ene,
5,6-di-(cyanooctyl)-bicyclo[2.2.1]hept-2-ene,
5,6-di-(isocyanatopropyl)-bicyclo[2.2.1]hept-2-ene,
5,6-di-(isocyanatohexyl)-bicyclo[2.2.1]hept-2-ene,
5,6-di-(aminomethyl)-bicyclo[2.2.1]hept-2-ene,
5,6-di-(aminopentyl)-bicyclo[2.2.1]hept-2-ene,
5-methylaminopropyl-6-aminopropylbicycyo[2.2.1]
  hept-2-ene,
5-diethylaminomethyl-6-aminoethylbicyclo[2.2.1]
  hept-2-ene,
5-diethylaminomethyl-6-ethylaminoethylbicyclo[2.2.1]
  hept-2-ene,
5,6-di(diethylaminoethyl)bicyclo[2.2.1]hept-2-ene,
5,6-di(acetoxymethyl)bicyclo[2.2.1]hept-2-ene,
5,6-di(octanoyloxypropyl)bicyclo[2.2.1]hept-2-ene,
5,6-di(chloroformylmethyl)bicyclo[2.2.1]hept-2-ene,
5,6-di(chloroformylbutyl)bicyclo[2.2.1]hept-2-ene,
5,6-di(carbamyloxymethyl)bicyclo[2.2.1]hept-2-ene,
5,6-di(carbamyloxypropyl)bicyclo[2.2.1]hept-2-ene,
5,6-di(carbamylethyl)bicyclo[2.2.1]hept-2-ene,
5,6-di(carbamylpentyl)bicyclo[2.2.1]hept-2-ene,
5-N-methylcarbamylmethyl-6-carbamyloxymethyl-
  bicyclo[2.2.1]-hept-2-ene,
5-N,N-dimethylcarbamylethyl-6-carbamyloxyethyl-
  bicyclo[2.2.1]hept-2-ene,
5,6-di-(N-methylcarbamylmethyl)bicyclo[2.2.1]hept-2-
  ene,
5,6-di-(N,N-diethylcarbamylmethyl)bicyclo[2.2.1]hept-
  2-ene,
5,6-di-(carboxymethylene)bicyclo[2.2.1]hept-2-ene,
5,6-di-(carboxyoctylene)bicyclo[2.2.1]hept-2-ene,
5,6-di-(carbomethoxymethylene)bicyclo[2.2.1]hept-2-
  ene,
5,6-di-(carbomethoxybutylene)bicyclo[2.2.1]hept-2-ene,
5,6-di-(carbopentoxypropylene)bicyclo[2.2.1]hept-2-ene,
5,6-di-(2,3-epoxypropyl)bicyclo[2.2.1]hept-2-ene,
5,6-di-(3,4-epoxybutyl)bicyclo[2.2.1]hept-2-ene,
bicyclo[2.2.1]hept-5-(en-2,3-dimethyl diglycidyl ether,
bicyclo[2.2.1]hept-5-en-2,3-dibutyl diglycidyl ether,
bicyclo[2.2.1]hept-5-en-2,3-dicarboxylic anhydride,
bicyclo[2.2.1]hept-5-en-2,3-dicarboximide,
N-(2-cyanoethyl)bicyclo[2.2.1]hept-5-en-2,3-dicarbox-
  imide,
N-(2-cyanoisopropyl)bicyclo[2.2.1]hept-5-en-2,3-
  dicarboximide,
N-(4-cyanobutyl)bicyclo[2.2.1]hept-5-en-2,3-
  dicarboximide,
N-(2-hydroxyethyl)bicyclo[2.2.1]hept-5-en-2,3-
  dicarboximide,
N-hydroxymethylbicyclo[2.2.1]hept-5-en-2,3-
  dicarboximide,
(N-5-hydroxypentyl)bicyclo[2.2.1]hept-5-en-2,3-
  dicarboximide,
N-(2-aminoethyl)bicyclo[2.2.1]hept-5-en-2,3-
  dicarboximide,
N-(4-aminobutyl)bicyclo[2.2.1]hept-5-en-2,3-
  dicarboximide,
N-(N'-methylaminoethyl)bicyclo[2.2.1]hept-5-en-2,3-
  dicarboximide,
N-chloromethylbicyclo[2.2.1]hept-5-en-2,3-
  dicarboximide,
N-(3-chloropropyl)bicyclo[2.2.1]hept-5-en-2,3-
  dicarboximide,
N-(2-bromoethyl)bicyclo[2.2.1]hept-5-en-2,3-
  dicarboximide,
N-(5-chloropentyl)bicyclo[2.2.1]hept-5-en-2,3-
  dicarboximide,
ethyl 3-phenylbicyclo[2.2.1]hept-5-en-2-carboxylate,
3-phenylbicyclo[2.2.1]hept-5-en-2-carboxamide,
phenyl bicyclo[2.2.1]hept-5-en-2-yl carbonate,
ethyl bicyclo[2.2.1]hept-5-en-2-yl carbonate,
N-butyl N'-bicyclo[2.2.1]hept-5-en-2-yl urea,
bicyclo[2.2.1]hept-5-en-2-yl ethyl ether,
bicyclo[2.2.1]hept-5-en-2-yl ethyl sulfide,
bicyclo[2.2.1]hept-5-en-2-yl ethyl sulfone,
bicyclo[2.2.1]hept-5-en-2-yl ethyl sulfoxide,
1-(bicyclo[2.2.1]hept-5-en-2-yl)-1,3-propanediol,
1-(bicyclo[2.2.1]hept-5-en-2-yl)propylene carbonate,
bicyclo[2.2.1]hept-5-en-2-ylmethyl cyclopentyl ether,
(bicyclo[2.2.1]hept-5-en-2-ylmethyl cyclohexyl ether,
1,1-dioxotetrahydrothien-3-yl bicyclo[2.2.1]hept-5-en-
  2-ylmethyl ether,
2,3-bicyclo[2.2.1]hept-5-enylene carbonate,
2,3-bicyclo[2.2.1]hept-5-enylene carbamate,
2,3-bicyclo[2.2.1]hept-5-enylene sulfite,
4-oxatricyclo[5.2.1.0$^{2,6}$]dec-8-ene,
4-thiatricyclo[5.2.1.0$^{2,6}$]dec-8-ene,
4,7-methanohexahydrobenzo[c]thiophene oxide, and the like.

These substituted bicyclo[2.2.1]hept-2-enes can be produced, for example, from cyclopentadiene or dicyclopentadiene and an alkene of the formula:

by the procedures generally set forth in "Organic Reactions," volumes IV and V. If the proper dienophile is not readily available for the synthesis of a given bicyclo-[2.2.1]heptene, cyclopentadiene may be reacted with a simpler dienophile and further chemical transformations may then be carried out on the resulting Diels-Alder adduct. For example, the adduct of cyclopentadiene and allylamine may be converted to the hydrochloride and treated with phosgene to yield the corresponding isocyanate. The isocyanate may then be reacted with other active-hydrogen compounds such as alcohols or amines to yield ureas or carbamates, that is, dimethylaminoethanol to yield 2-dimethylaminoethyl bicyclo[2.2.1]hept-5-en-2-ylcarbamate.

Other examples include the preparation of the cyclic sulfite of bicyclo[2.2.1]hept-5-en-2,3-diol via known procedures from the diol; dehydration of the cyclopentadiene-2-butene-1,4-diol adduct to yield the corresponding ether; selective oxidation of bicyclo[2.2.1]hept-5-en-2-yl ethyl sulfide to the sulfoxide; conversion of 2,3- and 2,7-dihydroxybicyclo[2.2.1]hept-2-enes to cyclic carbonates with phosgene and base; and conversion of monohydroxy derivatives to the corresponding chloroformates, carbamates, and carbamates with phosgene, other alcohols, base and ammonia or amines via known methods. Thus by known methods the compound may be made by the addition of bicyclo[2.2.1]hept-5-en-2-ylmethanol to 2,5-dihydro-1,1-dioxothiophene.

Another group of bicyclo[2.2.1]-2-heptenes which is copolymerized with ethylene is represented by the formula:

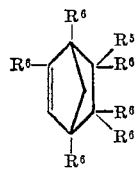
(II)

wherein $R^6$ represents a hydrogen atom or a hydrocarbyl radical having up to about 15 carbon atoms. The hydrocarbyl radicals or alkyl radicals containing from 1 to about 15 carbon atoms, such as methyl, ethyl, propyl, isopropyl, pentyl, octyl, 2-ethylhexyl, nonyl, decyl, dodecyl, pentadecyl, and the like; aryl radicals, such as phenyl, naphthyl, and the like; aralkyl radicals, such as benzyl, phenethyl, alpha mesityl, naphthal, and the like; alkaryl radicals, such as tolyl, xylyl, mesityl, methylnaphthyl, and the like; and cycloalkyl radicals, such as cyclobutyl, cyclopentyl, methylcyclopentyl, dimethylcyclopentyl, ethylcyclopentyl, cyclohexyl, methylcyclohexyl, cycloheptyl, and the like.

Illustrative of the bicyclo[2.2.1]-2-heptenes corresponding to Formula II, one can mention:

bicyclo[2.2.1]-2-heptene,
1-methylbicyclo[2.2.1]-2-heptene,
2-methylbicyclo[2.2.1]-2-heptene,
5-methylbicyclo[2.2.1]-2-heptene,
1-ethylbicyclo[2.2.1]-2-heptene,
5-ethylbicyclo[2.2.1]-2-heptene,
2-isopropylbicyclo[2.2.1]-2-heptene,
5-isopropylbicyclo[2.2.1]-2-heptene,
5-pentylbicyclo[2.2.1]-2-heptene,
2-hexylbicyclo[2.2.1]-2-heptene,
5-heptylbicyclo[2.2.1]-2-heptene,
5-(2-ethylhexyl)bicyclo[2.2.1]-2-heptene,
1-nonylbicyclo[2.2.1]-2-heptene,
5-nonylbicyclo[2.2.1]-2-heptene,
5-dodecylbicyclo[2.2.1]-2-heptene,
5-pentadecylbicyclo[2.2.1]-2-heptene,
1,3-dimethylbicyclo[2.2.1]-2-heptene,
5,5-dimethylbicyclo[2.2.1]-2-heptene,
1,3-diisopropylbicyclo[2.2.1]-2-heptene,
5,5-diisopropylbicyclo[2.2.1]-2-heptene,
5,5-dibutylbicyclo[2.2.1]-2-heptene,
5,5-dihexylbicyclo[2.2.1]-2-heptene,
5-methyl-5-ethylbicyclo[2.2.1]-2-heptene,
5,5-didecylbicyclo[2.2.1]-2-heptene,
5,6-dimethylbicyclo[2.2.1]-2-heptene,
5-methyl-6-ethylbicyclo[2.2.1]-2-heptene,
5,6-dipropylbicyclo[2.2.1]-2-heptene,
5,6-diisopropylbicyclo[2.2.1]-2-heptene,
5,6-dipentylbicyclo[2.2.1]-2-heptene,
5,6-di(2-ethylhexyl)bicyclo[2.2.1]-2-heptene,
5,6-didodecylbicyclo[2.2.1]-2-heptene,
5,5,6-trimethylbicyclo[2.2.1]-2-heptene,
5,5,6-tripropylbicyclo[2.2.1]-2-heptene,
5,5-dimethyl-6-ethylbicyclo[2.2.1]-2-heptene,
5,5,6,6-tetramethylbicyclo[2.2.1]-2-heptene,
5,5,6,6-tetraisopropylbicyclo[2.2.1]-2-heptene,
5,5-dimethyl-6,6-diethylbicyclo[2.2.1]-2-heptene,
1-phenylbicyclo[2.2.1]-2-heptene,
2-phenylbicyclo[2.2.1]-2-heptene,
5-phenylbicyclo[2.2.1]-2-heptene,
5-naphthylbicyclo[2.2.1]-2-heptene,
5,5-diphenylbicyclo[2.2.1]-2-heptene,
5,6-diphenylbicyclo[2.2.1]-2-heptene,
5,5,6-triphenylbicyclo[2.2.1]-2-heptene,
2-benzylbicyclo[2.2.1]-2-heptene,
5-benzylbicyclo[2.2.1]-2-heptene,
5-phenethylbicyclo[2.2.1]-2-heptene,
5,6-dibenzylbicyclo[2.2.1]-2-heptene,
5-α-mesitylbicyclo[2.2.1]-2-heptene,
5-naphthalbicyclo[2.2.1]-2-heptene,
2-tolylbicyclo[2.2.1]-2-heptene,
5-tolylbicyclo[2.2.1]-2-heptene,
5,6-ditolylbicyclo[2.2.1]-2-heptene,
5-xylylbicyclo[2.2.1]-2-heptene,
5-methylnaphthylbicyclo[2.2.1]-2-heptene,
5-cyclobutylbicyclo[2.2.1]-2-heptene,
5,6-dicyclopentylbicyclo[2.2.1]-2-heptene,
5-methylcyclopentylbicyclo[2.2.1]-2-heptene,
5-isopropylcyclopentylbicyclo[2.2.1]-2-heptene,
5-cyclohexylbicyclo[2.2.1]-2-heptene, and the like.

These hydrocarbyl substituted bicyclo[2.2.1]-2-heptenes are readily produced from cyclopentadiene or dicyclopentadiene compounds and an alkene of the formula:

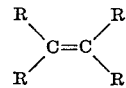

by the procedures set forth in U.S. Patent 2,340,908.

Still another group which can be copolymerized with ethylene is the group of ethylenically substituted bicyclo[2.2.1]hept-2-enes represented by the generic formula:

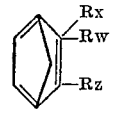
(III)

wherein Rx when taken singly is a hydrogen atom or an alkyl group having up to 4 carbon atoms, preferably 1 or 2; Rw when taken singly is an $$-X'\overset{Ry}{C}=CH_2$$

group wherein X' is a divalent alkylene group $$(-C_bH_{2b}-)$$

or a $-C_bH_{2b}OOC-$ group in which $b$ has a value of from 0 to 4 and Ry can be a hydrogen atom or a methyl radical; and Rw and Rx when taken jointly represent the methylene group $=CH_2$; and Rz is a hydrogen atom or an alkyl group having up to 4 carbon atoms, preferably 1 or 2 carbon atoms.

While, as previously indicated, polymerization occurs through the double bond in the ring structure, some polymerization with these ethylenically substituted bicycloheptenes also occurs through the double bond of the Rw group or joint Rw plus Rx group, as will be more fully explained below.

The ethylenically substituted bicyclo[2.2.1]-hept-2-enes subgeneric to Formula III are members of the following classes:

Class 4

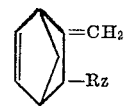

Class 5

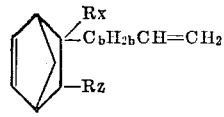

Class 6

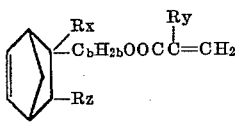

Illustrative of the compounds defined by the above formulae one can mention the following:

5-methylenebicyclo[2.2.1]hept-2-ene,
5-vinylbicyclo[2.2.1]hept-2-ene,
5-allylbicyclo[2.2.1]hept-2-ene,
5-(3-butenyl)bicyclo[2.2.1]hept-2-ene,
5-(4-pentenyl)bicyclo[2.2.1]hept-2-ene,
5-(2-methylbut-3-enyl)bicyclo[2.2.1]hept-2-ene,
5-(5-hexenyl)bicyclo[2.2.1]hept-2-ene,
5-propenylbicyclo[2.2.1]hept-2-ene,
5-isopropenylbicyclo[2.2.1]hept-2-ene,
5-allyl-5-methylbicyclo[2.2.1]hept-2-ene,
5-propenyl-6-methylbicyclo[2.2.1]hept-2-ene,
5-methylene-6-methylbicyclo[2.2.1]hept-2-ene,
5-methylene-6-propylbicyclo[2.2.1]hept-2-ene,
5-vinyl-6-ethylbicyclo[2.2.1]hept-2-ene,
5-(5-hexenyl)-6-methylbicyclo[2.2.1]hept-2-ene,
bicyclo[2.2.1]hept-5-en-2-yl acrylate,
bicyclo[2.2.1]hept-5-en-2-yl methacrylate,
bicyclo[2.2.1]hept-5-en-2-methyl acrylate,
bicyclo[2.2.1]hept-5-en-2-methyl methacrylate,
bicyclo[2.2.1]hept-5-en-2-propyl acrylate,
bicyclo[2.2.1]hept-5-en-2-propyl methacrylate,
bicyclo[2.2.1]hept-5-en-2-isopropyl acrylate,
bicyclo[2.2.1]hept-5-en-2-isopropyl methacrylate,
bicyclo[2.2.1]hept-5-en-2-butyl acrylate,
bicyclo[2.2.1]hept-5-en-2-butyl methacrylate,
bicyclo[2.2.1]hept-5-en-2-isobutyl acrylate
bicyclo[2.2.1]hept-5-en-2-isobutyl methacrylate,
bicyclo[2.2.1]hept-5-en-t-butyl acrylate,
bicyclo[2.2.1]hept-5-en-t-butyl methacrylate,
6-methylbicyclo[2.2.1]hept-5-en-2-yl acrylate,
6-propylbicyclo[2.2.1]hept-5-en-2-yl methacrylate, and the like.

In addition, it has been found that copolymers with ethylene can also be produced by the processes of this invention with bicycloheptene compounds such as the following:

bis(bicyclo[2.2.1]hept-5-en-2-yl)sulfone,
bicyclo[2.2.1]hept-5-en-2-methylbicyclo[2.2.1]hept-5-en-2-carboxylate,
bis(bicyclo[2.2.1]hept-2-en-2-methyl)maleate, and the like. Also suitable are those substituted bicycloheptene compounds wherein the substituents thereon are such that tetracyclic compounds result such as:

tetracyclo[6.2.1.1$^{3,6}$.0$^{2,7}$]-4-dodecene,
9-(aminomethyl)tetracyclo[6.2.1.1$^{3,6}$.0$^{2,7}$]-4-dodecene,
9-(glycidyl)tetracyclo[6.2.1.1$^{3,6}$.0$^{2,7}$]-4-dodecene,
3,4,5,6,12,12-hexachlorotetracyclo[6.2.1.1$^{3,6}$.0$^{2,7}$]-dodeca-4,9 diene,
tetracyclo[6.2.1.1$^{3,6}$.0$^{2,7}$]dodeca-4,9-diene, and the like.

The concentration of the bicyclo[2.2.1]hept-2-ene compounds herein contemplated in the polymerizable feed mixture can vary from about 0.1 to about 50 percent by weight, or more, based on the total weight of monomers charged. A preferred range is from about 1 to about 40 percent by weight; with the range of from about 2.5 to 20 percent by weight most preferred.

The ethylene used can vary widely in purity, with commercially available ethylene, which generally varies in purity from about 90 to about 99.5 percent or more ethylene, being entirely suitable. The other gases normally found in small amounts in commercial ethylene are acetylene, butylene, ethane, propane, and the like. In most instances these impurities are present at a total concentration of less than about 5 percent by weight.

The processes of this invention are carried out at pressures from about 500 to about 10,000 atmospheres, preferably from about 750 to 3,000 atmospheres. The temperature can be varied from about 40° C. to about 350° C., preferably from about 150° C. to about 225° C.

The polymerization is carried out in the presence of a catalytic amount of a free radical catalyst, said amount being sufficient to catalyze the polymerization reaction. The free radical catalysts that can be employed are well known to the ordinary chemist skilled in the art, and the term "free radical catalyst" has an established and recognized meaning to the skilled chemist. The catalytic amount can be varied from about 1 p.p.m. to about 10,000 p.p.m. or more, preferably from about 1 p.p.m. to about 1,000 p.p.m., and most preferably from about 2 p.p.m. to about 200 p.p.m., based on the total amount of polymerizable monomers. Among the catalysts suitable for use are those which produce free radicals under the reaction conditions, such as molecular oxygen, peroxides, azo compounds, and so forth. The catalysts can be used singly or in combination. Illustrative are the azo type catalysts disclosed in the U.S. Patent 2,471,959; the peroxides, such as hydrogen peroxide, lauroyl peroxide, dipropionyl peroxide, butyryl peroxide, benzoyl peroxide, acetyl peroxide, peracetic acid, di-tertiary-butyl peroxide, acetyl benzoyl peroxide, diethyl peroxide, succinoyl peroxide, urea peroxide, tetralin peroxide, and so forth; the alkali metal persulfates, perborates, and percarbonates; the ammonium persulfates, perborates, and percarbonates; diisopropyl peroxydicarbonate; and the like.

The copolymers range from viscous liquids to elastomers to solids. The solid copolymers increase in amorphous character as the amount of substituted bicyclo[2.2.1]hept-5-ene in the polymer increases. Copolymers produced from a feed charge containing about 40 percent by weight of the bicyclo[2.2.1]hept-2-ene derivative are practicasly completely amorphous in character.

The copolymers of this invention cover a broad range of melt indices of from 0 to 1000 decigrams per minute, or higher. The densities of the copolymers also vary widely and are dependent upon the particular bicyclo[2.2.1]hept-2-ene compound employed and its concentration and generally vary from about 0.90, or less, to about 0.95 gram per cc., or higher, as shown.

Since the substituted bicyclo[2.2.1]hept-2-ene compounds of Formula I used to produce copolymers of this invention contain polar groups, these copolymers are generally more readily dyeable and more susceptible to conventional printing techniques. That these substituted bicyclo[2.2.1]hept-2-ene compounds polymerize in the bicycloheptanylene form and not in the cyclopentanyl-vinylene form is indicated and established by infrared analysis which show the absence of strong absorption bands at 10.35 microns and 11.3 microns. The 10.35 and 11.3 micron bands are characteristic of the cyclopentanyl-vinylene unit and the absence thereof in the infrared spectra of these copolymers is indicative of the fact that they have a different chemical structure than is possessed by any of the copolymers heretofore known.

The copolymers produced with the bicyclo[2.2.1]hept-2-ene compounds of Formula II and Formula III retain many of the desirable properties of high pressure polyethylene, and in addition have many other advantages. They are non-polar and thus retain the excellent electrical properties of polyethylene but have the further advantage of being much less subject to stress crack resistance failure, a deficiency of polyethylene which limits its use as an electrical conductor insulator. The polymers produce clear, soft, pliable, and flexible films, which have substantially improved impact strength compared to polyethylene. At the higher combined bicyclo[2.2.1]-2-heptene contents, the polymers are elastomeric in nature and are useful for the production of clear elastic films, an application in which polyethylene is not suitable because of its greater stiffness. The polymers of this invention are very tough, having higher tensile strength than high pressure polyethylene; and yield soft but tough moldings. These polymers have a unique combination of desirable properties not to be found in any polymers now commercially available.

The differences in stiffness, or flexibility, are a direct result of the differences in the chemical structure of the polymers of this invention. The polymers heretofore known have high densities, are linear, and remain rigid over the entire composition range, whereas the polymers of this invention become increasingly more flexible as the amount of bicyclo[2.2.1]-2-heptene is increased. This is clearly shown in FIGURE 1, in which the stiffness modulus of polymers produced by the process of this invention and polymers produced according to the processes of the previously mentioned prior art patents is plotted versus the concentration of bicyclo[2.2.1]-2-heptene in the feed. The graph clearly shows a linear unchanging high stiffness modulus for the prior art material and a decrease in stiffness for the polymers of this invention as the bicyclo[2.2.1]-2-heptene concentration is increased. This behavior is explainable only by a difference in the chemical structure of the polymers.

Figure 2:
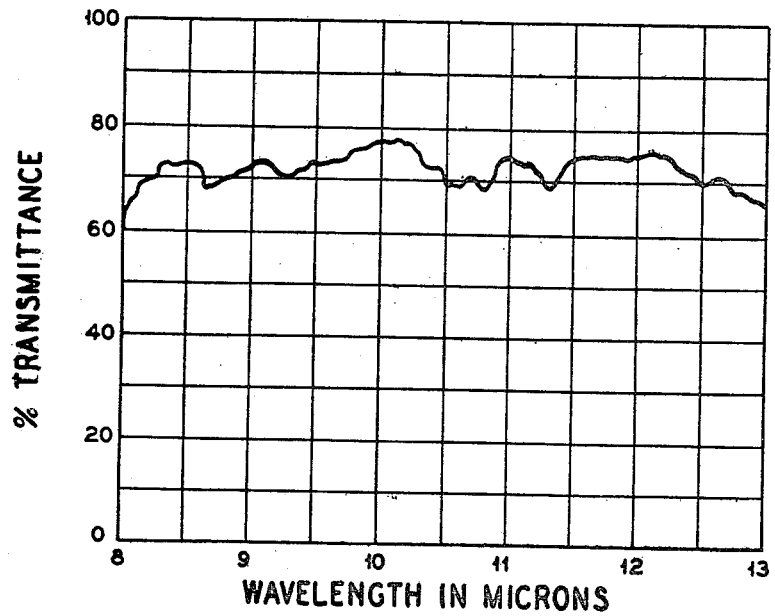
Figure 3:
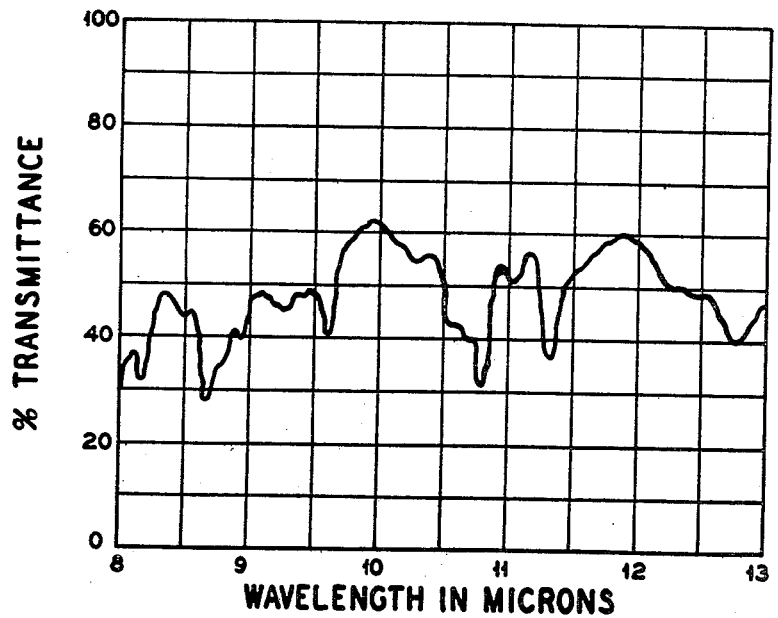

FIGURES 2 and 3 show the infrared spectra characteristic of the novel copolymers produced by the processes of the instant invention and of the copolymers heretofore known. The copolymers of FIGURES 2 and 3 were produced using a charging stock containing about 25 percent by weight of bicyclo[2.2.1]-2-heptene and about 75 percent by weight of ethylene; however, the nature of the curves will not change with variations in the concentration of bicyclo[2.2.1]-2-heptene. The area in the curves useful in distinguishing the copolymers of this invention over the copolymers heretofore known is that portion between the 8 and the 13 microns wavelengths. The spectrum shown in FIGURE 2 represents the spectrum of a copolymer produced according to the process of the instant invention. The spectrum shown in FIGURE 3 represents the spectrum of a copolymer as heretofore known, as produced according to the process disclosed in U.S. Patent 2,799,668. A glance at the two spectra readily shows the differences in their appearance in the 8 to 13 microns range and the bands found in this area are most useful in distinguishing the two types of copolymers. From the spectrum of FIGURE 2 it can be seen that the copolymer of the instant invention has a uniform high transmission in the 8 to 13 microns range and that there are no sharp or pronounced absorption bands; whereas, the copolymer heretofore known has a much lower transmission in the 8 to 13 microns range, and its spectrum, FIGURE 3, shows a great number of sharp absorption bands.

FIGURE 2 shows slight evidence of absorption bands at the 8.7, 10.8, and 11.3 microns wavelengths only, and no absorption at the 8.2, 8.95, 9.65, 10.35, 11.05, and 12.8 microns wavelengths. On the other hand, FIGURE 3 shows strong absorption bands at the 8.2, 8.7, 9.65, 10.8, 11.3, and 12.8 microns wavelengths, and weaker, but positive, absorption bands at the 8.95, 10.35, and 11.05 microns wavelengths. The absorption at 10.35 microns is due to ethylenic transunsaturation in a hydrocarbon molecule, at 11.05 microns it is due to vinyl unsaturation, and at 11.3 microns it is due to vinylidene unsaturation.

When the bicycloheptene compound is hydrocarbyl substituted of the type defined in Formula II, at the highest defined comonomer concentrations the copolymers produced are liquids suitable for use as plasticizers for polyolefinic resins and they possess a wide and unique combination of desirable properties not to be found in any polymers now commercially available. The differences in stiffness, or flexibility, are a direct result of the differences in their chemical structures. The polymers heretofore known have higher densities, are linear, and remain rigid as the comonomer concentration is increased.

The polymers and copolymers of this type heretofore known, as produced by the processes disclosed in the aforementioned patents, contain the bicyclo[2.2.1]-2-heptene, in the polymer chain in the form of cyclopentanylvinylene units. The presence of this unit is established by infrared analysis, which shows strong absorption bands at 10.35 microns due to ethylenic transunsaturation in a hydrocarbon molecule and at 11.3 microns due to vinylidene unsaturation. Thus, in this instance, the area in the infrared curve between the 9.5 and 12 microns wavelengths is important in distinguishing polymers which contain the cyclopentanylvinylene unit in the chain over those which do not.

Figure 10:
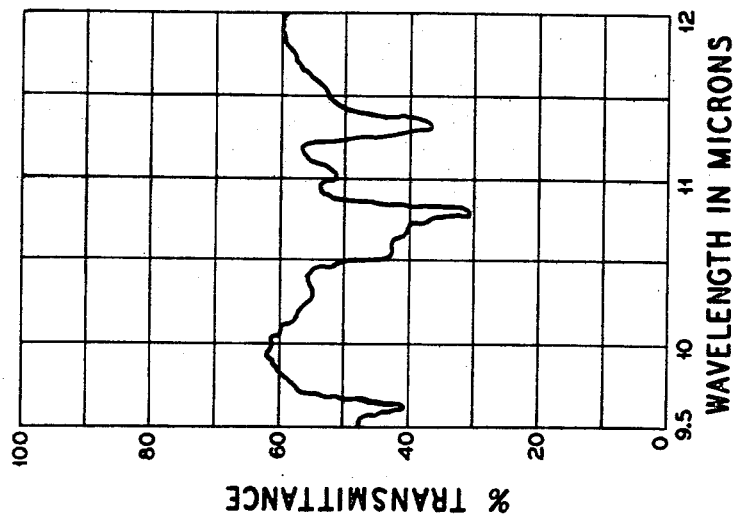

The spectra shown in FIGURES 4 to 9 represent spectra of copolymers produced using compounds of Formula II according to the process of the instant invention. The spectrum shown in FIGURE 10 represents the spectrum of a polymer as heretofore known which contains cyclopentanylvinylene units in the polymer chain. A comparision of FIGURES 4 to 9 with FIGURE 10 clearly shows that these copolymers differ from the polymers heretofore produced. As seen from the spectra, the polymers of the instant invention, FIGURES 4 to 9, show no sign of absorption peaks at 10.35 microns or 11.3 microns, whereas the polymer heretofore known, FIGURE 10, shows definite absorption peaks at 10.35 and 11.3 microns. In addition, FIGURE 10 shows other absorption peaks not present in the spectra of the copolymers produced by the process of the instant invention.

Figure 4:
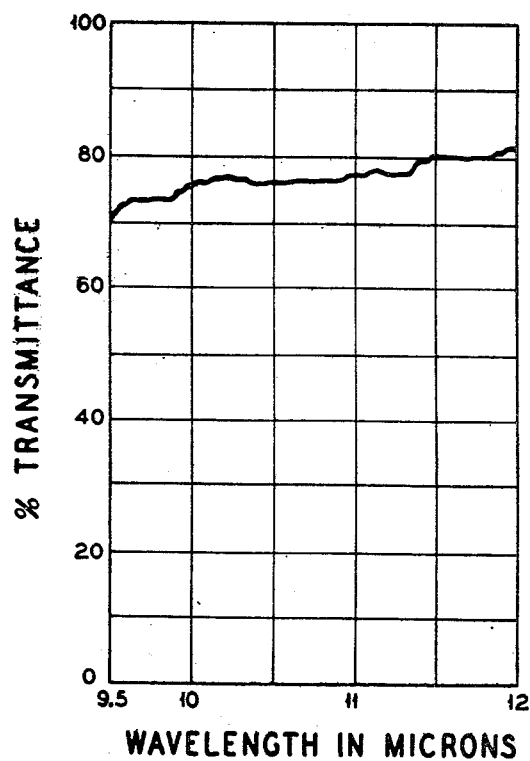
Figure 6:
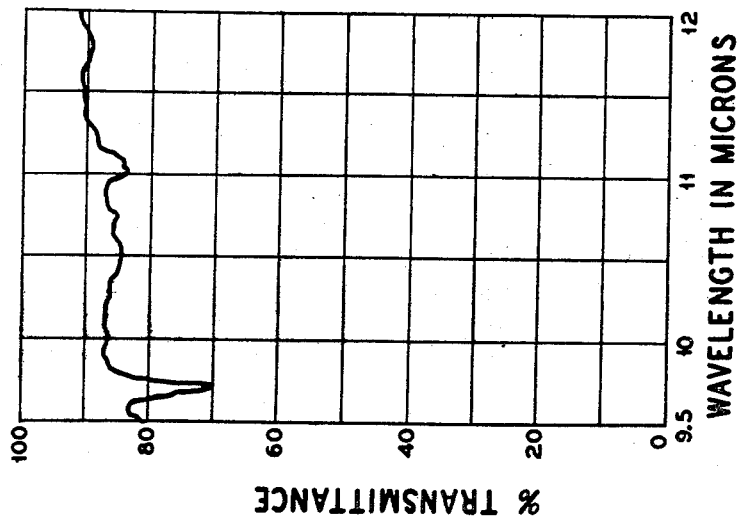
Figure 5:
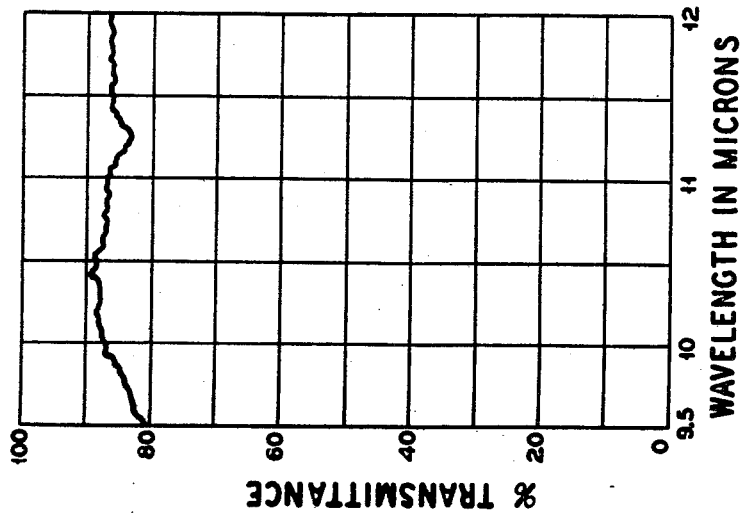
Figure 8:
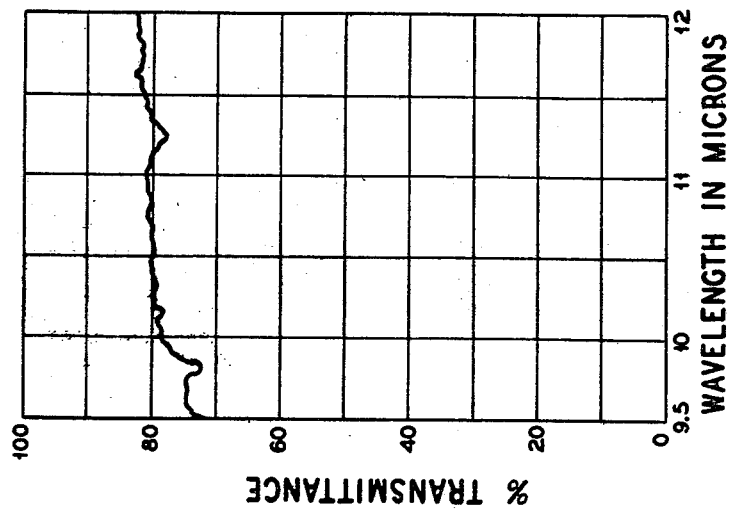
Figure 7:
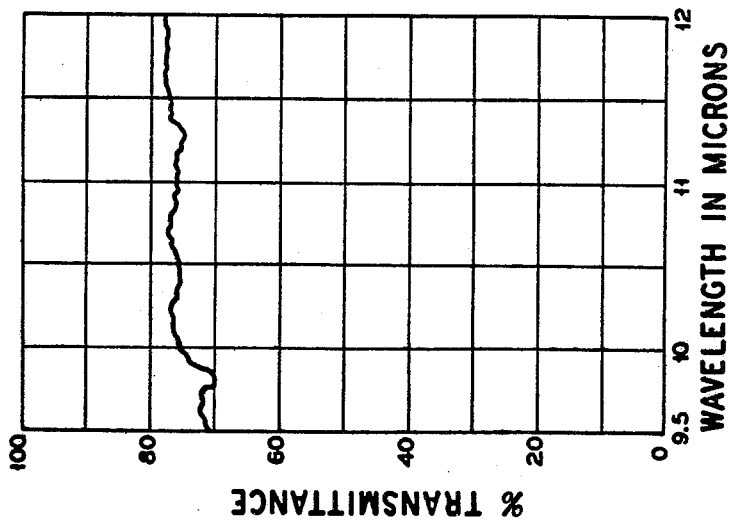
Figure 9:
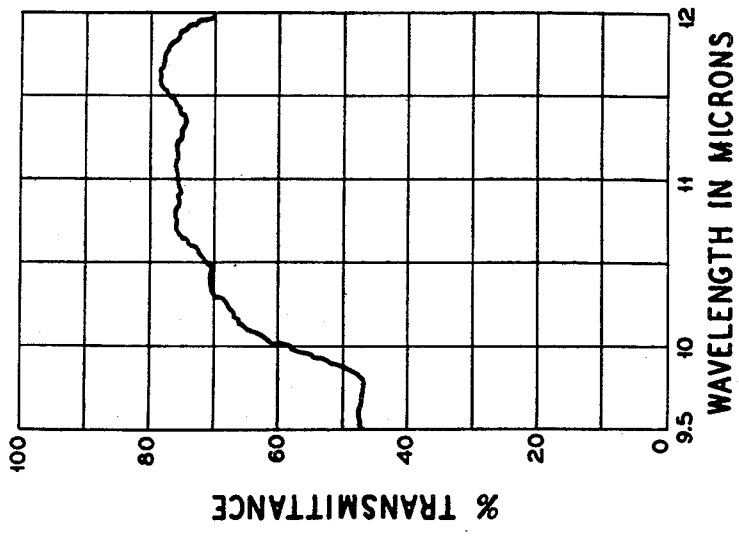

FIGURE 4 is the spectra of a copolymer of ethylene and 5-methylbicyclo[2.2.1]-2-heptene. FIGURE 5 is the spectra of a copolymer of ethylene and 5-hexylbicyclo-[2.2.1]-2-heptene. FIGURE 6 is the spectra of a copolymer of ethylene and 5-phenylbicyclo[2.2.1]-2-heptene. FIGURE 7 is the spectra of a copolymer of ethylene and 5,5-dimethylbicyclo[2.2.1]-2-heptene. FIGURE 8 is the spectra of a copolymer of ethylene and 5,6-dimethylbicyclo[2.2.1]-2-heptene. FIGURE 9 is the spectra of a copolymer of ethylene and 1,3-diisopropylbicyclo-[2.2.1]-2-heptene.

The compounds defined by Formula II are present in the polymer chain as bicycloheptanylene units of the formula:

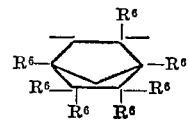

and those compounds defined by Formula III are present as bicycloheptanylene units of the formula:

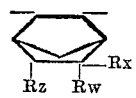

The copolymers of this invention are not stiff nor brittle. They produce soft, pliable, flexible films with many having desirable elastic properties and easy printability.

In the following examples, which are not to be construed as limiting this invention in any manner, the properties of the polymers were determined using the following test procedures:

Melt index—A.S.T.M. D1238–52T, at 190° C. and 43.1 p.s.i.g.
Flow rate—A.S.T.M. D1238–52T, at 190° C. and 206 p.s.i.g.
Density—A.S.T.M. 1505–57
Stiffness modulus—A.S.T.M. D638–56T
Tensile strength—A.S.T.M. D638–56T
Elongation—A.S.T.M. D638–56T
Specific viscosity—At 80° C., using a solution of 0.4 gram copolymer in 100 milliliters methylcyclohexane.

EXAMPLE 1

To a stainless steel lined stirred autoclave of 1480 milliliter capacity there were charged 200 grams of benzene, 435 grams of water, 2.0 milliliters of a 5 weight percent solution of di-tertiary-butyl peroxide in benzene, and 20 grams of 5-cyanobicyclo[2.2.1]hept-2-ene. The autoclave was sealed, flushed with ethylene, pressured with ethylene to 2,000 p.s.i.g., and heated to 160° C., while vigorously agitating. The ethylene pressure was adjusted to 15,000 p.s.i.g. and the polymerization was carried out while maintaining the pressure and temperature at about the stated values for about three and one half hours. After cooling, the autoclave was vented, the solid ethylene/5 - cyanobicyclo-[2.2.1]hept - 2-ene copolymer was filtered, washed with methanol, and dried. The copolymer weighed 72 grams and was a white resin having a specific viscosity of 0.24, a melt index of 259 dgm./min., a density of 0.9324 g./cc., a stiffness modulus of 21,600 p.s.i., a tensile strength of 1,350 p.s.i., and an elongation of 80 percent. Analysis showed that the copolymer contained 2.8 percent polymerized 5-cyanobicyclo-[2.2.1]hept-2-ene. The infared analysis indicated that the 5-cyanobicyclo[2.2.1]hept-2-ene was polymerized in the polymer chain in the form of bicyclo units of the formula

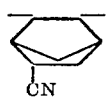

In a similar manner the copolymer of ethylene/5-cyanoethylbicyclo[2.2.1]hept-2-ene is produced.

EXAMPLE 2

In a manner similar to that described in Example 1, in the same autoclave a mixture of ethylene, 336 grams of 5-cyanobicyclo[2.2.1]hept-2-ene, 535 grams of benzene, and 1.0 gram of benzoyl peroxide was polymerized at 90° C. and 15,000 p.s.i.g. for six hours. There was produced 17½ grams of ethylene/5-cyanobicyclo[2.2.1]hept-2-ene copolymer. Analysis indicated that the copolymer contained about 60 percent copolymerized 5-cyanobicyclo[2.2.1]hept-2-ene.

In a similar manner copolymers of ethylene/5,6-dicyanobicyclo[2.2.1]hept-2-ene and ethylene/5,6-di(2-cyanoethyl)bicyclo[2.2.1]hept-2-ene are prepared.

EXAMPLE 3

In a manner similar to that described in Example 1, in the same autoclave a mixture of ethylene, 20 grams of 5-chlorobicyclo[2.2.1]hept-2-ene, 500 grams of benzene, and 2.0 milliliters of a 5 weight percent solution of di-tertiary-butyl peroxide in benzene was polymerized at 160° C. and 15,000 p.s.i.g. for 2.7 hours. There was produced 97 grams of ethylene/5-chlorobicyclo[2.2.1]hept-2-ene copolymer having a specific viscosity of 0.47, a melt index of 3.6 dgm./min., a flow rate of 47 dgm./min., a density of 0.9268 gram/cc., a stiffness modulus of 21,600 p.s.i., a tensile strength of 2,560 p.s.i., and an elongation of 890 percent. Analysis indicated that the copolymer contained 2.5 percent copolymerized 5-chlorobicyclo[2.2.1]hept-2-ene, which was present in the polymer chain in the form of bicyclo units of the formula

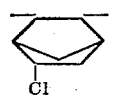

In a similar manner copolymers of ethylene/5-bromobicyclo[2.2.1]hept-2-ene and ethylene/5,6-dichlorobicyclo[2.2.1]hept-2-ene are prepared.

EXAMPLE 4

In a manner similar to that described in Example 1, in the same autoclave four runs were performed at 15,000 p.s.i.g. to produce the copolymer of ethylene/5-chloromethylbicyclo[2.2.1]hept-2-ene. The reaction conditions and results are tabulated in Table I. In all cases the 5-chloromethylbicyclo[2.2.1]hept-2-ene was polymerized in the polymer chain in the form of bicyclo units of the formula

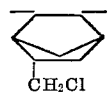

TABLE I

| | Run | | | |
|---|---|---|---|---|
| | 1 | 2 | 3 | 4 |
| 5-chlorobicyclo[2.2.1]hept-2-ene, grams | 27 | 119.5 | 18 | 57 |
| Benzene, grams | 465 | 434 | 475 | 475 |
| Di-tertiary-butyl peroxide ml. of 5% sol. in benzene | 2 | 2.2 | 2 | 2 |
| Temperature, °C | 162 | 160 | 161 | 161 |
| Yield, grams | 75 | 24 | 92 | 38 |
| Melt index, dgm./min | 31 | >10,000 | 5.7 | 509 |
| Flow rate, dgm./min | 273 | | 61 | |
| Density, g./cc | 0.9295 | | 0.9256 | 0.9406 |
| Stiffness modulus, p.s.i. ×10⁻³ | 18.5 | | 19.6 | 21.4 |
| Tensile strength, p.s.i. ×10⁻³ | | | 2.1 | 1.2 |
| Elongation, percent | | | 800 | 40 |
| Specific viscosity | 0.35 | 0.13 | 0.44 | 0.23 |
| 5-chlorobicyclo[2.2.1]hept-2-ene in copolymer, percent | 6.6 | 16.9 | 4.3 | 9.4 |

In a similar manner the copolymer of ethylene/5-chlorobutylbicyclo[2.2.1]hept-2-ene is prepared.

EXAMPLE 5

In a manner similar to that described in Example 1, in the same autoclave a mixture of ethylene, 20 grams of 5,6-di-(chloromethyl)-bicyclo[2.2.1]hept-2-ene, 500 grams of benzene, and 2.0 milliliters of a 5 weight percent solution of di-tertiary-butyl peroxide in benzene was polymerized at 160° C. and 15,000 p.s.i.g. for six hours. There was produced 12 grams of ethylene/5,6-di-(chloromethyl)-bicyclo[2.2.1]hept-2-ene copolymer having a specific viscosity of 0.18. Analysis indicated that the copolymer contained 5.4 percent copolymerized 5,6-di-(chloromethyl)-bicyclo[2.2.1]hept-2-ene, which was present in the polymer chain in the form of bicyclo units of the formula

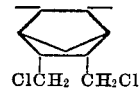

In a similar manner the copolymer of ethylene/5,6-di-(chlorooctyl)-bicyclo[2.2.1]hept-2-ene is produced.

EXAMPLE 6

In a manner similar to that described in Example 1, in the same autoclave seven runs were performed at 15,000 p.s.i.g. pressure to produce the copolymer of ethylene/5-hydroxymethylbicyclo[2.2.1]hept - 2 - ene. The reaction conditions and results are tabulated in Table II. In all cases the 5 - hydroxymethylbicyclo[2.2.1]hept-2-ene was polymerized in the polymer chain in the form of bicyclo units of the formula

In a similar manner the copolymer of ethylene/5-hydroxybicyclo[2.2.1]hept-2-ene is produced.

TABLE II

| | Run | | | | | | |
|---|---|---|---|---|---|---|---|
| | 1 | 2 | 3 | 4 | 5 | 6 | 7 |
| 5-hydroxymethylbicyclo[2.2.1]-hept-2-ene, grams | 20 | 20 | 20 | 63 | 20 | 64 | 140 |
| Benzene, grams | 200 | 475 | 200 | 135 | 500 | 500 | 500 |
| Water, grams | 435 | | 435 | 435 | | | |
| Di-tertiary-butyl peroxide, ml. of 5% sol. in benzene | 2.0 | | 2.0 | 3.0 | 2.0 | 2.0 | 2.0 |
| Benzoyl peroxide, grams | | 1.0 | | | | | |
| Temperature, °C | 160 | 100 | 160 | 160 | 160 | 160 | 160 |
| Reaction time, hours | 1.4 | 5.7 | 5.5 | 0.95 | 4.5 | 5.0 | 5.0 |
| Yield, grams | 100 | 38 | 153 | 98 | 118 | 49 | 18 |
| Melt index, dgm./min | 1.46 | 552 | 1.0 | 195 | 5.5 | 570 | >10,000 |
| Flow rate, dgm./min | 18 | | 12 | | 70 | | |
| Density, g./cc | 0.9262 | 0.9430 | 0.9250 | 0.9360 | 0.9252 | 0.9358 | 0.9482 |
| Stiffness modulus, p.s.i. × $10^{-3}$ | 17.6 | 53.3 | 16.9 | 15.3 | [1]13.6 | 18.7 | 11.3 |
| Tensile strength, p.s.i. × $10^{-3}$ | 2.08 | 2.53 | 2.64 | 1.46 | 2.05 | 1.13 | 1.00 |
| Elongation, percent | 690 | 15 | 855 | 120 | 940 | 150 | 170 |
| Specific viscosity | 0.49 | 0.24 | 0.57 | 0.25 | 0.44 | 0.22 | 0.13 |
| 5-hydroxymethylbicyclo[2.2.1]-hept-2-ene, percent in resin | 9.8 | 3.4 | 14.0 | 16.1 | 4.0 | 21.0 | 23.0 |

[1] At 28° C.

EXAMPLE 7

Low molecular weight polymers of ethylene and 5-hydroxymethyl[2.2.1]hept-2-ene were prepared in a 1480 milliliter stainless steel lined, stirred autoclave by the following procedure. The autoclave was charged with the 5-hydroxymethylbicyclo[2.2.1]hept-2-ene, part of the acetone, and the tertiary-butyl hydroperoxide solution. The autoclave was sealed and flushed with high purity nitrogen and vented. Ethylene was charged from a weighing cylinder and the autoclave was heated to the operating temperature. The pressure was raised to 15,000 p.s.i.g. by adding acetone. The polymerization was carried out by maintaining the pressure and temperature at about the stated values for the desired time. The crude product from the autoclave was recovered and the unreacted monomers and solvent were stripped under vacuum. The residue products were viscous liquids. The reaction conditions and results are listed in Table III.

TABLE III

| | Run | | |
|---|---|---|---|
| | 1 | 2 | 3 |
| 5-hydroxymethylbicyclo [2.2.1]hept-2-ene, grams | 126 | 216 | 126 |
| Ethylene, grams | 114 | 48 | 123 |
| Acetone, grams | 926 | 949 | 938 |
| Tertiary-butyl hydroperoxide, ml. of 5.0 wt. percent solution in benzene, grams | 5.0 | 5.0 | 5.0 |
| Temperature, °C | 190 | 192 | 170 |
| Reaction time, hr | 3.5 | 4.0 | 4.0 |
| Yield, grams | 126 | 204 | 18 |
| Molecular weight [1] | | | 246 |
| Hydroxyl number | 410 | 426 | 243 |
| Carbon, percent | 76.98 | 77.41 | 77.27 |
| Hydrogen, percent | 9.57 | 9.39 | 10.92 |

[1] Ebullioscopic.

EXAMPLE 8

In manner similar to that described in Example 1, in the same autoclave two runs were performed to produce the copolymer of ethylene/5,6-di-(hydroxymethyl)-bicyclo[2.2.1]hept-2-ene at 15,000 p.s.i.g. pressure. The reaction conditions and results are tabulated in Table IV. In both cases the 5,6-di-(hydroxymethyl)-bicyclo[2.2.1]hept-2-ene was polymerized in the copolymer chain in the form of bicyclo units of the formula

OCHH₂  CH₂OH

In a similar manner copolymers of ethylene/5,6-dihydroxybicyclo[2.2.1]hept-2-ene and ethylene/5,6-di(hydroxypentyl)-bicyclo[2.2.1]hept-2-ene are produced.

TABLE IV

| | Run | |
|---|---|---|
| | 1 | 2 |
| 5,6-di-(hydroxymethyl)bicyclo-[2.2.1]hept-2-ene, grams | 20 | 20 |
| Benzene, grams | 500 | 500 |
| Di-tertiary-butyl peroxide, ml. of 5 wt. percent solution in benzene | 2.0 | 2.0 |
| Reaction time, hours | 5.1 | 1.1 |
| Yield, grams | 98 | 108 |
| Melt index, dgm./min | 28 | 5.2 |
| Flow rate, dgm./min | 250 | 63 |
| Density, g./cc | 0.9270 | 0.9268 |
| Stiffness modulus, p.s.i.×$10^{-3}$ | 24.4 | 21.4 |
| Tensile strength, p.s.i.×$10^{-3}$ | 2.19 | 2.33 |
| Elongation, percent | 780 | 840 |
| Specific viscosity | 0.37 | 0.44 |
| 5,6-di-(hydroxymethyl)bicyclo-[2.2.1]hept-2-ene, percent in resin | 3.4 | 3.0 |

EXAMPLE 9

In a manner similar to that described in Example 1, in the same autoclave a mixture of ethylene, 20 grams of 5-isocyanatomethylbicyclo[2.2.1]hept-2-ene, 50 grams of benzene and 2.0 milliliters of 5 weight percent solution of di-tertiary-butyl peroxide in benzene was polymerized at 160° C. and 15,000 p.s.i.g. for 2.25 hours. There was produced 51 grams of ethylene/5-isocyanatomethylbicyclo[2.2.1]hept-2-ene copolymer having a specific viscosity of 0.46, a melt index of 0.42 dgm./min., a flow rate of 6.1 dgm./min., a density of 0.9302 gram/cc., a stiffness modulus of 23,700 p.s.i., a tensile strength of 2,180 p.s.i., and an elongation of 720 percent. Analysis indicated that the copolymer contained 2.8 percent copolymerized 5-isocyanatomethyl bicyclo[2.2.1]hept-2-ene, which was present in the polymer chain in the form of bicyclo units of the formula

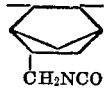

CH₂NCO

In a similar manner the copolymer of ethylene/5-isocyanatobicyclo[2.2.1]hept-2-ene, ethylene/5,6-diisocyanatobicyclo[2.2.1]hept-2-ene, and ethylene/5,6-di-(isocyanatoethyl)-bicyclo[2.2.1]hept-2-ene are produced.

EXAMPLE 10

In a manner similar to that described in Example 1, in the same autoclave, three runs were performed to produce the copolymer of ethylene/bicyclo[2.2.1]hept-5-en-2-yl acetate at 15,000 p.s.i.g. The reaction conditions and results are tabulated in Table V. In all cases the bicyclo[2.2.1]hept-5-en-2-yl acetate was polymerized in the polymer chain in the form of bicyclo units of the formula

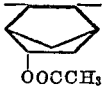

OOCCH₃

In a similar manner the copolymers of ethylene/bicyclo[2.2.1]hept-5-en-2,3-ylene diacetate and the copolymer of ethylene/bicyclo[2.2.1]hept - 5 - en - 2 - yl-butylene acetate are produced.

TABLE V

| | Run | | |
|---|---|---|---|
| | 1 | 2 | 3 |
| Bicyclo[2.2.1]hept-5-en-2-ylacetate, grams | 20 | 65 | 116 |
| Benzene, grams | 500 | 500 | 514 |
| Di-tertiary-butyl peroxide, ml. of 5 wt. percent solution in benzene | 2.0 | 2.0 | 5.0 |
| Reaction time, hours | 0.7 | 3.5 | 2.4 |
| Yield, grams | 105 | 86 | 88 |
| Melt index, dgm./min | 0.28 | 33 | 73 |
| Flow rate, dgm./min | 4.7 | | |
| Density, g./cc | 0.9288 | 0.9314 | 0.9367 |
| Stiffness modulus, p.s.i.×10⁻³ | 17.5 | 9.4 | 6.8 |
| Tensile strength, p.s.i.×10⁻³ | 3.48 | 2.35 | 2.12 |
| Elongation, percent | 1,040 | 1,040 | 1,120 |
| Specific viscosity | 0.63 | 0.34 | 0.29 |
| Bicyclo[2.2.1]hept-5-en-2-yl acetate, percent in resin | 4.1 | 12.0 | 25.8 |

Run 3 was performed at 140° C.

EXAMPLE 11

In a manner similar to that described in Example 1, in the same autoclave, a mixture of ethylene, 20 grams of bicyclo[2.2.1]hept-5-en-2 - ylmehyl chloroformate, 500 grams of benzene, and 2.0 milliliters of 5 weight percent solution of di-tertiary-butyl peroxide in benzene was polymerized at 160° C. and 15,000 p.s.i.g. for six hours. There was produced 24 grams of ethylene/bicyclo[2.2.1] hept-5-en-2-ylmethyl chloroformate having a melt index of 199 dgm./min., a density of about 1 gram/cc., a stiffness modulus of 29,500 p.s.i., a tensile strength of 1,640 p.s.i, and an elongation of 40 percent. Analysis indicated that the copolymer contained 7.3 percent copolymerized bicyclo[2.2.1]hept-5-en-2-ylmethyl chloroformate which was present in the polymer chain in the form of bicyclo units of the formula

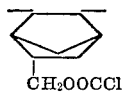

CH₂OOCCl

In a similar manner the copolymer of ethylene/5,6-di-(chloroformylmethyl)bicyclo[2.2.1]hept-2-ene is produced.

EXAMPLE 12

In a manner similar to that described in Example 1, in the same autoclave two runs were performed to produces the copolymer of ethylene/2-dimethylaminoethyl bicyclo[2.2.1]hept-5-en - 2 - ylmethylcarbamate at 15,000 p.s.i.g. The reaction conditions and results are tabulated in Table VI. In all cases the diethylaminoethyl bicyclo[2.2.1]hept-5-en-2-ylmethylcarbamate was polymerized in the polymer chain in the form of bicyclo units of the formula

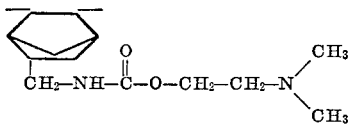

In a similar manner the copolymer of ethylene/propyl bicyclo[2.2.1]hept-5-en-2-ylmethlycarbamate, ethylene/2-diethylaminomethyl bicyclo[2.2.1]hept-5-en-2-ylmethyl-carbamate, and ethylene/phenyl bicyclo[2.2.1]hept-5-en-2-ylmethylcarbamate are produced.

TABLE VI

| | Run | |
|---|---|---|
| | 1 | 2 |
| 2-dimethylaminoethyl bicyclo-[2.2.1] hept-5-en-2-yl-methylcarbamate | 20 | 20 |
| Benzene, grams | 500 | 500 |
| Di-tertiary butyl peroxide, ml. of 5 wt. percent solution in benzene | 2.0 | 0.5 |
| Reaction time, hours | 0.8 | 4.0 |
| Yield, grams | 103 | 51 |
| Melt index, dgm./min | 6.3 | 12 |
| Flow rate, dgm./min | 72 | 130 |
| Density, g./cc | 0.9263 | 0.9282 |
| Stiffness modulus, p.s.i.×10⁻³ | 23.7 | 23.2 |
| Tensile strength, p.s.i.×10⁻³ | 2.02 | 2.19 |
| Elongation, percent | 910 | 860 |
| Specific viscosity | 0.39 | 0.40 |
| 2-dimethylaminoethyl bicyclo-[2.2.1]hept-5-en-2-yl-methyl-carbamate, per cent in resin | 4.1 | 4.8 |

EXAMPLE 13

In a manner similar to that described in Example 1, in the same autoclave, a mixture containing ethylene, 20 grams of 5-aminomethylbicyclo[2.2.1]hept-2-ene, 200 grams of tertiary butanol, 400 grams of water, and 1.0 grams of azobis-isobutyronitrile was polymerized at 70° C. and 15,000 p.s.i.g. for five hours. There was obtained 4 grams of ethylene/5-aminomethylbicyclo[2.2.1] hept-2-ene copolymer having a specific viscosity of 0.16. Analysis indicated that the copolymer contained 19 percent copolymerized 5-aminomethylbicyclo[2.2.1]hept-2-ene in the form of units having the formula

CH₂NH₂

In a similar manner copolymers of ethylene/5-aminobicyclo[2.2.1]hept - 2 - ene ethylene/5,6 - diaminobicyclo-[2.2.1]hept - 2 - ene, and ethylene/5,6 - di - (diethylaminopropyl)bicyclo[2.2.1]hept-2-ene are produced.

EXAMPLE 14

In a manner similar to that described in Example 1, in the same autoclave, eight runs were performed to produce the copolymer of ethylene/5-carboxycyclo[2.2.1] hept - 2 - ene at 15,000 p.s.i.g. The reaction conditions and results are tabulated in Table VII. In all cases 5-carboxybicyclo[2.2.1]hept-2-ene was polymerized in the polymer chain in the form of bicyclo units of the formula

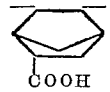

COOH

In a similar manner the copolymers of ethylene/bicyclo[2.2.1]hept-5-en-2-ylacetic acid, ethylene/5,6 - dicarboxybicyclo[2.2.1]hept-2-ene, and ethylene/5,6 - di(carboxymethyl)-bicyclo[2.2.1]hept-2-ene are produced.

TABLE VII

| | Run | | | | | | | |
|---|---|---|---|---|---|---|---|---|
| | 1 | 2 | 3 | 4 | 5 | 6 | 7 | 8 |
| Temperature, ° C | 160 | 160 | 90 | 160 | 40 | 160 | 160 | 90 |
| 5-carboxybicyclo[2.2.1]hept-2-ene, grams | 19.8 | 63.1 | 20 | 20 | 24 | 20 | 64 | 20 |
| Benzene, grams | 475 | 475 | 475 | 200 | 555 | 200 | 118 | 190 |
| Water, grams | | | | 435 | | 435 | 388 | 505 |
| Di-tertiary-butyl peroxide [1] | 2.0 | 2.5 | | 2.0 | | 2.0 | 4.0 | |
| Benzoyl peroxide, gram | | | 1.0 | | | | | 1.0 |
| Isopropyl percarbonate, gram | | | | | 1.0 | | | |
| Reaction time, hours | 6.0 | 6.0 | 6.0 | 1.75 | 5.6 | 3.3 | 2.9 | 2.5 |
| Yield, grams | 22 | 9 | 47 | 81 | 3 | 80 | 64 | 46 |
| Melt index, dgm./min | 9,066 | | 1,100 | 119 | | 145 | 1,000 | 990 |
| Density, g./cc | | | 0.9602 | 0.9388 | | 0.9362 | 0.9482 | 0.9520 |
| Siffness modulus, p.s.i. × 10⁻³ | | | 86.2 | 31.0 | | 32.2 | 39.0 | 70.2 |
| Tensile strength, p.s.i.×10⁻³ | | | 1.02 | 1.59 | | 1.58 | 1.93 | 1.92 |
| Elongation, percent | | | 13 | 100 | | 110 | 30 | 20 |
| Specific viscosity | 0.16 | | 0.18 | 0.23 | | 0.22 | [2] 0.088 | 0.16 |
| 5-carboxybicyclo[2.2.1]hept-2-ene, percent in resin | 10.3 | 25.6 | 4.3 | 9.2 | | 9.5 | 26.8 | 10.1 |

[1] Ml. of 5 wt. percent solution in benzene.
[2] In cyclohexanone at 80° C.

EXAMPLE 15

In a manner similar to that described in Example 1, in the same autoclave, a mixture containing ethylene, 20 grams of 9-(bicyclo[2.2.1]hept-5-en-2-yl) nonanoic acid, 500 grams of benzene, and 2.0 milliliters of a 5 weight percent solution of di-tertiary-butyl peroxide in benzene was polymerized at 160° C. and 15,000 p.s.i.g. for four hours. There was produced 110 grams of ethylene/9-(bicyclo[2.2.1]hept-5-en-2-yl)-nonanoic acid copolymer having a specific viscosity of 0.45, a melt index of 4.0 dgm./min., a density of 0.9230 g./cc., a stiffness modulus at room temperature of 18,300, a tensile strength of 1,720 p.s.i., and an elongation of 550 percent. Analysis indicated that the copolymer contained 0.4 percent copolymerized 9-(bicyclo[2.2.1]hept-5-en-2-yl)-nonanoic acid which was present in the polymer chain in the form of bicyclo units of the formula

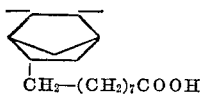

CH$_2$—(CH$_2$)$_7$COOH

EXAMPLE 16

In a manner similar to that described in Example 1, in the same autoclave, a mixture of ethylene, 20 grams of ethyl bicyclo[2.2.1]hept-2-en-5-carboxylate, 435 grams of water, 200 grams of benzene, and 2.0 milliliters of a 5 weight percent solution of di-tertiary-butyl peroxide in benzene was polymerized at 160° C. and 15,000 p.s.i.g. for 2.3 hours. There was obtained 95 grams of ethylene/ethyl bicyclo[2.2.1]hept-2-en-5-carboxylate copolymer having a specific viscosity of 0.29, a melt index of 82 dgm./min., a density of 0.9384 g./cc., a stiffness modulus of 16,300 p.s.i., a tensile strength of 1,180 p.s.i., and an elongation of 95 percent. Analysis indicated that the copolymer contained 3.2 percent copolymerized ethyl bicyclo[2.2.1]hept-2-en-5-carboxylate which was present in the polymer chain in the form of bicyclo units of the formula

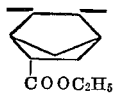

COOC$_2$H$_5$

In a similar manner copolymers of ethylene/propyl bicyclo[2.2.1]hept-2-en-5-carboxylate, ethylene/diethyl bicyclo[2.2.1]hept-5-en-2,3-dicarboxylate, and ethylene/5,6-di-(butoxycarbonylethyl)-bicyclo [2.2.1] hept-2-ene are prepared.

EXAMPLE 17

In a manner similar to that described in Example 1, in the same autoclave, a mixture of ethylene, 20 grams of bicyclo[2.2.1]hept-5-en-2-carboxamide, 500 grams of benzene, and 2.0 milliliters of a 1 weight percent solution of di-tertiary-butyl peroxide in benzene was polymerized at 160° C. and 15,000 p.s.i.g. for 3.4 hours. There was produced 101 grams of ethylene/bicyclo[2.2.1]hept-5-en-2-carboxamide polymer having a specific viscosity of 0.28, a melt index of 82 dgm./min., a density of 0.9274 g./cc., a stiffness modulus at room temperature of 29,400 p.s.i., a tensile strength of 1,680 p.s.i., and an elongation of 80 percent. Analysis indicated that the copolymer contained 4.4 percent copolymerized bicyclo-[2.2.1]hept-5-en-2-carboxamide which was present in the polymer chain in the form of bicyclo units of the formula

CONH$_2$

In a similar manner a copolymer of ethylene/5,6-di-carbamylpropylbicyclo[2.2.1]hept-2-ene is produced.

EXAMPLE 18

In a manner similar to that described in Example 1, in the same autoclave, a mixture containing ethylene, 20 grams of N,N-dimethylbicyclo[2.2.1]hept-5-en-2-carboxamide, 500 grams of benzene, and 2.0 milliliters of a 1 weight percent solution of di-tertiary-butyl peroxide in benzene was polymerized at 160° C. and 15,000 p.s.i.g. for 5.3 hours. There was produced 10 grams of ethylene/N,N - dimethylbicyclo[2.2.1]hept-5-en-2-carboxamide copolymer containing 5.5 percent copolymerized bicyclo compound which was present in the polymer chain in the form of bicyclo units of the formula

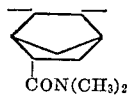

CON(CH$_3$)$_2$

In a similar manner copolymers of ethylene/N,N,N',N'-tetramethylbicyclo[2.2.1]hept-5-en-2,3-dicarboxamide,
ethylene/N,N-diethylbicyclo[2.2.1]hept-5-en-2-ylmethylcarboxamide, and
ethylene/5,6-di(N,N-dimethylcarbamylmethyl)bicyclo-[2.2.1]hept-2-ene are produced.

EXAMPLE 19

In a manner similar to that described in Example 1, in the same autoclave, two runs were performed to produce the copolymer of ethylene/5-epoxyethylbicyclo-[2.2.1]hept-2-ene at 15,000 p.s.i.g. The reaction conditions and results are tabulated in Table VIII. In all cases the 5-epoxyethylbicyclo[2.2.1]hept-2-ene was polymerized in the polymer chain in the form of bicyclo units of the formula

CHCH$_2$
\O/

In a similar manner the copolymer of ethylene/5-(3,4-epoxybutyl)bicyclo[2.2.1]hept-2-ene is produced.

TABLE VIII

| | Run | |
|---|---|---|
| | 1 | 2 |
| 5-epoxyethylbicyclo[2.2.1]hept-2-ene, grams | 20 | 60 |
| Benzene, grams | 500 | 500 |
| Di-tertiary-butyl peroxide, ml. of 5 weight percent solution in benzene | 2.0 | 2.0 |
| Reaction time, hours | 4.0 | 5.5 |
| Yield, grams | 132 | 87 |
| Melt index, dgm./min | 1.0 | 640 |
| Flow rate, dgm./min | 14.0 | |
| Density, g./cc | 0.9238 | 0.9308 |
| Stiffness modulus, p.s.i.×10$^{-3}$ | 15.6 | 11.7 |
| Tensile strength, p.s.i.×10$^{-3}$ | 3.20 | 1.55 |
| Elongation, percent | 1,100 | 730 |
| Specific viscosity | 0.53 | 0.28 |
| 5-epoxyethylbicyclo[2.2.1]hept-2-ene, percent in resin | 3.6 | 10.0 |

EXAMPLE 20

In a manner similar to that described in Example 1, in the same autoclave, a mixture of ethylene, 50 grams of bicyclo[2.2.1]hept-5-en-2-methyl glycidyl ether, 500 grams of benzene, and 1 gram of benzoyl peroxide was polymerized at 15,000 p.s.i.g. and 90° C. for seven hours. There was produced 44 grams of the copolymer of ethylene/bicyclo[2.2.1]hept-5-en-2-methyl glycidyl ether having a specific viscosity of 0.18. Analysis indicated that the copolymer contained 7.2 percent copolymerized bicyclo[2.2.1]hept-5-en-2-methyl glycidyl ether which was present in the polymer chain in the form of bicyclo units of the formula

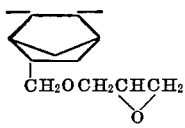

EXAMPLE 21

A low molecular weight polymer of ethylene and 2,3-epoxypropylbicyclo[2.2.1]hept-5-en-2-carboxylate was prepared in a 1490 milliliter capacity stainless steel lined, stirred autoclave by the following procedure. The autoclave was charged with 80 grams of 2,3-epoxypropylbicyclo[2.2.1]hept-5-en-2-carboxylate, 600 grams of toluene, and 5 milliliters of a 1 weight percent solution of di-tertiary-butyl peroxide in benzene. The autoclave was sealed and flushed with high purity nitrogen and vented. Ethylene (95 grams) was charged from a weighing cylinder and the autoclave was heated to 160° C. Additional toluene was pumped into the autoclave (521 grams) to raise the pressure to 15,000 p.s.i.g. The polymerization was carried out by maintaining the temperature and pressure at the stated values for twelve hours. The crude product from the autoclave was recovered and the unreacted monomers and solvent were stripped under vacuum. The polymer was a pale, tan viscous liquid. Analysis indicated that the copolymer contained 20.6 percent of 2,33-epoxypropylbiclyclo[2.2.1]hept-5-en-2-carboxylate which was in the polymer chain in the form of bicyclo units of the formula

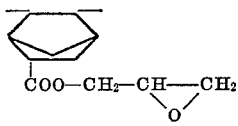

Carbon, hydrogen, and infrared analysis indicated that some epoxy monomer was present in which the epoxide ring had opened.

EXAMPLE 22

In a manner similar to that described in Example 1, in the same autoclave, a mixture containing ethylene, 14 grams of 2,3-epoxypropylbicyclo[2.2.1]hept-5-en-2-carboxylate, 717 grams of benzene, and 2 milliliters of 5 weight percent solution of di-tertiary-butyl peroxide was polymerized at 160° C. and 15,000 p.s.i.g for 1.2 hours. There was produced 85 grams of ethylene/2,-epoxypropylbicyclo[2.2.1]hept-5-en-2-carboxylate copolymer having a specific viscosity of 0.31, a melt index of 60 dgm./min., a density of 0.9278 g./cc., a stiffness modulus at room temperature of 19,300 p.s.i., a tensile strength of 1,130 p.s.i., and an elongation of 230 percent. Analysis showed that the copolymer contained copolymerized 2,3-epoxypropylbicyclo[2.2.1]hept-5-en-2-carboxylate which was present in the polymer chain in the form of bicyclo units of the formula

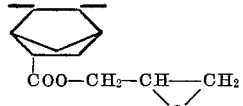

EXAMPLE 23

In a manner similar to that described in Example 1, in the same autoclave, six runs were performed to produce the copolymer of ethylene/bicyclo[2.2.1]hept-5-en-2,3-dicarboxylic anhydride at 15,000 p.s.i.g. The reaction conditions and results are tabulated in Table IX. In all cases the bicyclo[2.2.1]hept-5-en-2,3-dicarboxylic anhydride was polymerized in the polymer chain in the form of polycyclic units of the formula

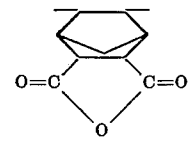

TABLE IX

|  | Run | | | | | |
|---|---|---|---|---|---|---|
|  | 1 | 2 | 3 | 4 | 5 | 6 |
| Bicyclo[2.2.1]hept-2-ene-5,6-dicarboxylic anhydride, grams | 19.6 | 20 | 20 | 20 | 63 | 74 |
| Benzene, grams | 475 | 475 | 200 | 475 | 126 | 90 |
| Water, grams | | | 435 | | 435 | 480 |
| Di-tertiary-butyl peroxide, ml. of 5 wt. percent sol. in benzene | 2.0 | 2.0 | 2.0 | | 3.0 | 4.0 |
| Benzoyl peroxide, gram | | | | 1.0 | | |
| Temperature, °C | 160 | 160 | 160 | 90 | 160 | 160 |
| Reaction time, hours | 6.0 | 6.0 | 4.0 | 5.1 | 4.3 | 2.4 |
| Yield, grams | 33 | 36 | 64 | 55 | 79 | 67 |
| Melt index, dgm./min | >10,000 | 2,000 | 3.6 | 290 | 27 | 38 |
| Density, g./cc | | 0.9572 | 0.9284 | 0.9560 | 0.9342 | 0.9350 |
| Stiffness modulus, p.s.i.×10⁻³ | | 17.2 | 20.2 | 54.3 | 18.2 | 22.7 |
| Tensile strength, p.s.i.×10⁻³ | | 1.06 | 2.01 | 2.13 | 1.60 | 1.29 |
| Elongation, percent | | 80 | 760 | 34 | 490 | 245 |
| Specific viscosity | 0.15 | 0.17 | 0.44 | 0.25 | 0.46 | 0.37 |
| Bicyclo[2.2.1]hept-2-ene-5,6-dicarboxylic anhydride, percent in resin | | 18.0 | 2.8 | 5.2 | 4.0 | 3.5 |

EXAMPLE 24

In a manner similar to that described in Example 1, in the same autoclave, a mixture containing ethylene, 20 grams of bicyclo[2.2.1]hept-5-en-2,3-dicarboximide, 500 grams of benzene, and 2 milliliters of 5 weight percent solution of di-tertiary-butyl peroxide was polymerized at 160° C. and 15,000 p.s.i.g for five hours. There was produced 28 grams of ethylene/bicyclo[2.2.1]hept-5-en 2,3-dicarboximide copolymer having a specific viscosity of 0.20, a melt index of 1,280 dgm./min., a density of 0.9276 g./cc., a stiffness modulus at room temperature of 25,000 p.s.i., a tensile strength of 1,570 p.s.i., and an elongation of 20 percent. Analysis indicated that the copolymer contained 4.5 percent copolymerized bicyclo [2.2.1]hept-5-en-2,3-dicarboximide which was present in the polymer chain in the form of polycyclic units of the formula

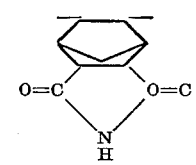

EXAMPLE 25

In a manner similar to that described in Example 1, in the same autoclave, a mixture containing ethylene, 20 grams of N-(2-cyanoethyl)bicyclo[2.2.1]hept-5-en-2,3-dicarboximide, 500 grams of benzene, and 2 milliliters of a 5 weight percent solution of di-tertiary-butyl peroxide in benzene was polymerized at 160° C. and 15,000 p.s.i.g. for five hours. There was produced 74 grams of ethylene/N-(2-cyanoethyl)bicyclo[2.2.1]hept-5-en-2,3-dicarboximide copolymer having a specific viscosity of 0.32, a melt index of 65 dgm./min., a density of 0.9384 g./cc., a stiffness modulus at room temperature of 27,900 p.s.i., a tensile strength of 1,610 p.s.i. and an elongation of 210 percent. Analysis indicated that the copolymer contained 7.5 percent copolymerized N-(2-cyanoethyl)bicyclo[2.2.1] hept-5-en-2,3-dicarboximide which was present in the polymer chain in the form of polycyclic units of the formula

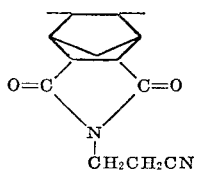

EXAMPLE 26

In a manner similar to that described in Example 1, in the same autoclave, a mixture containing ethylene, 20 grams of 1,1-dioxotetrahydrothien-3-yl bicyclo[2.2.1]hept-5-en-2-ylmethyl ether, 500 grams of benzene, and 2 milliliters of a 1 weight percent solution of di-tertiary-butyl peroxide in benzene was polymerized at 160° C. and 15,000 p.s.i.g. for 0.5 hour. There was produced 126 grams of ethylene/1,1-dioxotetrahydrothien-3-yl bicyclo[2.2.1] hept-5-en-2-ylmethyl ether copolymer having a specific viscosity of 0.47, a melt index of 6.2 dgm./min., a density of 0.9274 g./cc., a stiffness modulus at room temperature of 22,300 p.s.i., a tensile strength of 2,170 p.s.i. and an elongation of 950 percent. Analysis indicated that the copolymer contained copolymerized 1,1-dioxotetrahydrothien-3-yl bicyclo[2.2.1]hept-5-en-2-ylmethyl ether present in the polymer chain in the form of bicyclo units of the formula

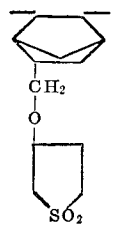

EXAMPLE 27

To a stainless steel-lined stirred autoclave of about 1.5 liter capacity there were charged 475 grams of benzene, 18 grams of bicyclo[2.2.1]-2-heptene, and 2 ml. of a 5 percent solution of di-tertiary-butyl peroxide in benzene. The autoclave was sealed, flushed several times with ethylene having an oxygen content of less than 20 p.p.m., pressured with the same ethylene to 2,000 p.s.i.g., and heated to 160° C. while vigorously agitating. The ethylene pressure was adjusted to 15,000 p.s.i.g. and maintained between 14,000 and 15,000 p.s.i.g. for about two hours at a temperature of about 160° C. After cooling, the autoclave was vented, the solid ethylene/bicyclo[2.2.1]-2-heptene copolymer was filtered, washed with methanol, and dried. The copolymer was a white, granular resin which was readily press molded into a flexible plaque having good gloss; films of excellent clarity were produced. The infrared spectrum of the copolymer was almost identical to that shown in FIGURE 2.

By a similar procedure, a series of copolymerizations was carried out. For convenience, the runs are tabulated in Table X; this table includes the physical properties of the copolymers produced. Runs 7, 8, and 9 were suspension polymerizations, 525 ml. of water being charged to the reactor at the start.

TABLE X

|  | Run | | | | | | | | |
|---|---|---|---|---|---|---|---|---|---|
|  | 1 | 2 | 3 | 4 | 5 | 6 | 7 | 8 | 9 |
| Bicyclo[2.2.1]-2-heptene, g | 18 | 37.5 | 37.5 | 37.5 | 57.5 | 78.8 | 67 | 106 | 200 |
| Percent on monomers |  | 8.6 | 8.7 | 8.85 | 13.1 | 17.8 | 17.1 | 24.6 | 40.5 |
| Benzene, g | 475 | 475 | 475 | 475 | 475 | 475 | 475 | 158 | 120 | 29 |
| Catalyst, ml. of 5% solution | 2.0 | 2.0 | 1 258 | 1 114 | 2.1 | 2.2 | 2.0 | 2.0 | 2.5 |
| Reaction time, hrs | 2.0 | 2.6 | 7.1 | 13.1 | 2.7 | 5.0 | 1.25 | 5.0 | 5.0 |
| Yield, g | 140 | 117 | 16 | 18 | 110 | 98 | 91 | 110 | 90 |
| Melt index, dgm./min | 0.099 | 17.0 | 6.5 | 17 | 18.8 | 112 | 25 | 78 | 850 |
| Flow rate, dgm./min | 1.76 |  | 63 | 150 | 170 |  |  |  |  |
| Density, g./cc | 0.9205 | 0.9209 | 0.9250 | 0.9206 | 0.922 | 0.9223 | 0.9245 | 0.9260 | 0.9296 |
| Stiffness modulus, p.s.i. X 10⁻³ | 15.2 | 12.4 | 10.4 | 10.9 | 9.4 | 8.0 | 5.9 | 4.1 | 0.6 |
| Tensile strength, p.s.i. X 10⁻³ | 3.08 | 2.7 | 3.55 | 2.01 | 2.2 | 1.4 | 1.5 | 1.3 | 0.2 |
| Elongation, percent | 863 | 794 | 1,190 | 980 | 1,134 | 1,130 | 900 | 1,100 | 300 |
| Specific viscosity | 0.69 | 0.51 | 0.48 | 0.42 | 0.38 | 0.29 | 0.37 | 0.29 | 0.18 |

¹ Oxygen catalyst, p.p.m. based on ethylene.

EXAMPLE 28

A series of polymerizations was carried out by a continuous process in a jacketed tubular reactor. The ethylene, containing oxygen as the catalyst, was compressed to about 35,000 p.s.i.g. and forced through the tubular reactor. The benzene solution of the bicyclo[2.2.1]-2-heptene was fed into the ethylene stream before it entered the reactor. The pressure in the reactor was maintained at about 35,000 p.s.i.g. After passing through the reactor, the liquid polymer and unreacted monomers were discharged intermittently through a suitable control valve into a separating vessel where the unreacted ethylene was separated from the polymer and unreacted bicyclo[2.2.1]-2-heptene. The polymer, with unreacted bicyclo[2.2.1]-2-heptene was removed from the separating vessel, washed with methanol, filtered, and dried. The runs in this series were of about 30 minutes duration. For convenience, the results are tabulated in Table XI.

TABLE XI

|  | Run | | | | | | | | | | | | | | |
|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 |
| Bicyclo[2.2.1]-2-heptene, wt. percent based on total charge | 4.87 | 5.2 | 5.9 | 7.7 | 5.04 | 4.8 | 5.0 | 5.3 | 5.6 | 6.66 | 5.6 | 5.4 | 6.5 | 5.2 | 6.3 |
| Wt. percent based on monomers | 5.7 | 5.7 | 6.33 | 9.5 | 5.9 | 5.3 | 5.6 | 6.2 | 6.6 | 7.18 | 6.04 | 6.4 | 7.0 | 6.1 | 7.35 |
| Benzene, wt. percent based on total charge | 9.7 | 10.3 | 2.5 | 15.3 | 10.1 | 9.6 | 10.0 | 10.7 | 11.2 | 2.71 | 2.4 | 10.8 | 2.8 | 10.4 | 12.3 |
| Oxygen, p.p.m. on C₂H₄ | 21 | 16 | 72 | 38 | 21 | 16 | 15 | 90 | 44 | 55 | 40 | 61 | 30 | 56 | 59 |
| Jacket temperature, ° C | 195 | 200 | 200 | 200 | 210 | 220 | 240 | 240 | 240 | 240 | 260 | 260 | 260 | 280 | 300 |
| Yield, g | 1,051 | 334 | 544 | 292 | 648 | 415 | 485 | 666 | 469 | 622 | 1,035 | 559 | 443 | 618 | 405 |
| Melt index, dgm./min | 0.019 | 0.021 | 0.058 | 0.05 | 0.05 | 0.034 | 0.03 | .12 | 0.45 | 0.60 | 1.82 | 0.80 | 1.48 | 4.7 | 22 |
| Flow rate, dgm./min | 0.19 | 0.93 | 0.98 | 0.90 | 0.74 | 0.244 | 0.59 | 14.9 | 5.4 | 7.68 | 23 | 10.3 | 15.0 | 55 | 214 |
| Density, g./cc | 0.9230 | 0.9218 | 0.9220 | 0.9222 | 0.9224 | 0.9218 | 0.9210 | 0.9204 | 0.9214 | 0.9240 | 0.9204 | 0.9210 | 0.9198 | 0.9192 | 0.9198 |
| Stiffness modulus, p.s.i.X10⁻³ | 20.4 | 17.8 | 16.8 | 17.0 | 18.8 | 15.4 | 18.0 | 14.2 | 14.6 | 14.9 | 14.8 | 14.7 | 13.6 | 12.5 | 12.2 |
| Tensile strength, p.s.i.X10⁻³ | 3.48 | 3.97 | 2.31 | 3.94 | 2.91 | 3.10 | 2.43 | 2.42 | 2.95 | 2.60 | 2.60 | 2.21 | 2.62 | 1.97 | 1.47 |
| Elongation, percent | 934 | 732 | 596 | 1,062 | 840 | 726 | 644 | 900 | 1,044 | 834 | 918 | 778 | 941 | 864 | 765 |
| Specific viscosity | 0.89 | 0.99 | 0.72 | 0.82 | 0.82 | 1.04 | 0.91 | 0.53 | 0.67 | 0.64 | 0.56 | 0.57 | 0.56 | 0.46 | 0.36 |

EXAMPLE 29

In a manner similar to that followed in Example 28, a mixture of ethylene containing 7.26 weight percent, based on the monomers, of bicyclo[2.2.1]-2-heptene, 2.3 weight percent, based on the total charge, of isooctane, and 55 p.p.m., based on the ethylene, of oxygen was polymerized at 300° C. jacket temperature. There was produced 418 grams of ethylene/bicyclo[2.2.1]-2-heptene copolymer having a melt index of 19 dgm./min., a flow rate of 183 dgm./min., a density of 0.9180 g./cc., a stiffness of 11,670 p.s.i. at room temperature, a tensile strength of 1,510 p.s.i., an elongation of 745 percent, a specific viscosity of 0.40.

EXAMPLE 30

In a manner similar to that followed in Example 28, a mixture of ethylene and bicyclo[2.2.1]-2-heptene was copolymerized using as catalyst a combination of oxygen and tertiary-butyl hydroperoxide. The reaction conditions and reuslts are tabulated in Table XII.

TABLE XII

|  | Run 1 | Run 2 |
|---|---|---|
| Bicyclo[2.2.1]-2-heptene: | | |
| Wt. percent based on total charge | 5.81 | 6.16 |
| Wt. percent based on total monomers | 6.25 | 6.64 |
| Benzene, wt. percent based on total charge | 2.48 | 2.65 |
| Oxygen, p.p.m. on $C_2H_4$ | 27 | 25 |
| t-Butyl-hydroperoxide, p.p.m. on $C_2H_4$ | 1.05 | 3.24 |
| Temperature, ° C | 260 | 260 |
| Yield | 540 | 623 |
| Melt index, dgm./min | 1.24 | 3.72 |
| Flow rate, dgm./min | 16.0 | 41.0 |
| Density, g./cc | 0.9226 | 0.9204 |
| Stiffness modulus, p.s.i. × $10^{-3}$ | 13.5 | 13.2 |
| Tensile strength, p.s.i. × $10^{-3}$ | 2.54 | 1.82 |
| Elongation, percent | 910 | 857 |
| Specific viscosity | 0.57 | 0.48 |

EXAMPLE 31

To a stainless steel-lined stirred autoclave of about 1.5 liter capacity there were charged 475 grams of benzene, 2 milliliters of a 5 percent by weight solution of di-tertiary-butyl peroxide in benzene, and 19.6 grams of 5-methylbicyclo[2.2.1]-2-heptene. The autoclave was sealed, flushed with ethylene, pressured with ethylene to 2,000 p.s.i.g., and heated to 160° C. while vigorously agitating. The ethylene pressure was adjusted to 15,000 p.s.i.g. and the polymerization was carried out maintaining the pressure and temperature at about the stated values for about one hour. After cooling, the autoclave was vented, the solid ethylene/5-methylbicyclo[2.2.1]-2-heptene copolymer was filtered, washed with methanol, and dried. The copolymer was a white, granular resin which was readily press molded into a flexible plaque having good gloss, and produced films of excellent clarity. The infrared spectrum of this copolymer is shown in FIGURE 4, and the 5-methylbicyclo[2.2.1]-2-heptene was polymerized in the polymer chain in the form of methylbicyclohpetanylene units of the formula:

The copolymerization was repeated using a higher initial concentration of 5-methylbicyclo[2.2.1]-2-heptene. The results of the two runs are tabulated in Table XIII.

TABLE XIII

|  | Run 1 | Run 2 |
|---|---|---|
| 5-methylbicyclo[2.2.1]-2-heptene, grams | 19.6 | 61.6 |
| Benzene, grams | 475 | 475 |
| Di-tertiary-butyl peroxide [1] | 2.0 | 2.0 |
| Temperature, ° C | 160 | 160 |
| Yield, grams | 119 | 107 |
| Melt index, dgm./min | 0.22 | 48.0 |
| Flow rate, dgm./min | 3.14 | 433 |
| Density, g./cc | 0.9206 | 0.9220 |
| Stiffness modulus, p.s.i.×$10^{-3}$ | 18.1 | 10.3 |
| Tensile strength, p.s.i.×$10^{-3}$ | 2.86 | 1.27 |
| Elongation, percent | 790 | 560 |
| Specific viscosity | 0.62 | 0.35 |

[1] Milliliters of a 5 percent by weight solution in benzene.

EXAMPLE 32

In a manner similar to that described in Example 31, a mixture of ethylene, 20 grams of 5-hexylbicyclo[2.2.1]-2-heptene, 500 grams of benzene, and 2.0 milliliter of a 5 percent by weight solution of di-tertiary-butyl peroxide in benzene was polymerized at 160° C. and 15,000 p.s.ig. for one hour. There was produced 114 grams of ethylene/5-hexylbicyclo[2.2.1]-2-heptene copolymer having a melt index of 0.68 dgm./min., a flow rate of 9.8 dgm./min., a density of 0.9252 g./cc., a stiffness modulus of 20,100 p.s.i., a tensile strength of 3,380 p.s.i., an elongation of 1,080 percent, and a specific viscosity of 0.57. The 5-hexyl-bicyclo-[2.2.1]-2-heptene was polymerized in the polymer chain in the form of hexylbicycloheptanylene units of the formula:

In a similar manner the copolymers of ethylene/5-nonylbicyclo[2.2.1]-2-heptene, ethylene/5-cyclohexylbicyclo-[2.2.1]-2-heptene, and ethylene/5-dodecylbicyclo[2.2.1]-2-heptene are prepared.

EXAMPLE 33

In a manner similar to that described in Example 31 a mixture of ethylene, 20 grams of 5-phenylbicyclo[2.2.1]-2-heptene, 475 grams of benzene, and 1 gram of dibenzoyl peroxide was polymerized at 90° C. and 15,000 p.s.i.g. for six hours. There was produced 28 grams of ethylene/5-phenylbicyclo[2.2.1]-2-heptene copolymer having a specific viscosity of 0.158. The 5-phenylbicyclo[2.2.1]-2-heptene was polymerized in the polymer chain in the form of phenylbicycloheptanylene units of the formula:

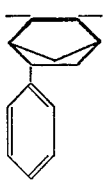

In a similar manner the copolymers ethylene/5-tolyl-bicyclo[2.2.1]-2-heptene, ethylene/5-naphthylbicyclo-[2.2.1]-2-heptene, ethylene/5-benzylbicylclo[2.2.1]-2-heptene, and ethylene/5,6-diphenylbicyclo[2.2.1]-2-heptene are produced.

EXAMPLE 34

In a manner similar to that described in Example 31 two runs were carried out to produce the copolymer of ethylene/5,5-dimethylbicyclo[2.2.1]-2-heptene. The reaction conditions and results are tabulated in Table XIV. The 5,5-dimethylbicyclo[2.2.1]-2-heptene was polymerized in the polymer chain in the form of dimethylbicycloheptanylene units of the formula:

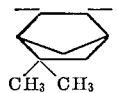

TABLE XIV

| | Run | |
|---|---|---|
| | 1 | 2 |
| 5,5-dimethylbicyclo[2.2.1]-2-heptene, grams | 20 | 20 |
| Benzene, grams | 500 | 500 |
| Di-tertiary-butyl peroxide [1] | 2 | 2 |
| Temperature, °C | 160 | 160 |
| Yield, grams | 198 | 94 |
| Melt index, dgm./min | 0.23 | 0.31 |
| Flow rate, dgm./min | 3.6 | 4.92 |
| Density, g./cc | 0.9196 | 0.9200 |
| Stiffness modulus, p.s.i.×10⁻³ | 13.6 | 13.7 |
| Tensile strength, p.s.i.×10⁻³ | 3.45 | 2.70 |
| Elongation, percent | 980 | 720 |
| Specific viscosity | 0.64 | 0.63 |

[1] Milliliters of 5 percent by weight solution in benzene.

EXAMPLE 35

In a manner similar to that described in Example 31 a mixture of ethylene, 20 grams of 5,6-dimethylbicyclo[2.2.1]-2-heptene, 500 grams of benzene, and 2 milliliters of a 5 percent by weight solution of di-tertiary-butyl peroxide in benzene was polymerized at 160° C. and 15,000 p.s.i.g. for one hour. There was produced 106 grams of ethylene/5,6-dimethylbicyclo[2.2.1]-2-heptene copolymer having a melt index of 1.76 dgm./min. a flow rate of 22.0 dgm./min., a density of 0.9204 g./cc., a stiffness of 12,900 p.s.i., a tensile strength of 3,040 p.s.i., an elongation of 1,022 percent, and a specific viscosity of 0.52. The 5,6-dimethylbicyclo[2.2.1]-2-heptene was polymerized in the polymer chain in the form of dimethylbicycloheptanylene units of the formula:

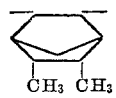

In a similar manner the copolymer of ethylene/5,5,6,6-tetramethylbicyclo[2.2.1]-2-heptene is prepared.

EXAMPLE 36

In a manner similar to that described in Example 31 a mixture of ethylene, 20 grams of 1,3-diisopropylbicyclo[2.2.1]-2-heptene, 500 grams of benzene, and 2 milliliters of a 1 percent by weight solution of di-tertiary-butyl peroxide in benzene was polymerized at 160° C. and 15,000 p.s.i.g. for 5.6 hours. There was produced 7.6 grams of ethylene/1,3-diisopropylbicyclo[2.2.1]-2-heptene copolymer having a specific viscosity of 0.15 and a melt index of 850 dgm./min. The 1,3-diisopropylbicyclo[2.2.1]-2-heptene was polymerized in the polymer chain in the form of diisopropylbicycloheptanylene units of the formula:

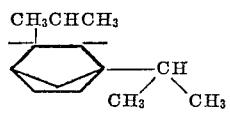

EXAMPLE 37

To a stainless steel lined autoclave of about 1.5 liter capacity there was charged a mixture of benzene, 5-methylenebicyclo[2.2.1]hept-2-ene, and di-tertiary-butyl peroxide as a catalyst. The autoclave was sealed, flushed several times with ethylene, pressured with the ethylene to about 2,000 p.s.i.g. and then heated to 160° C. while vigorously agitating. The ethylene pressure was adjusted to 15,000 p.s.i.g. and maintained at the indicated pressure and temperature values while the polymerization was carried out. After cooling, the autoclave was vented, the solid ethylene/5-methylenebicyclo[2.2.1]hept-2 - ene copolymers was filtered, washed with alcohol, and dried. The copolymer was white and was readily press molded into flexible plaques and films of excellent clarity. The 5-methylenebicyclo[2.2.1]hept-2 - ene copolymerized in the polymer molecule through both unsaturated bonds; some formed units of the formula

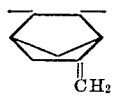

and some formed units of the formula

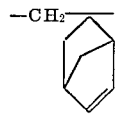

In similar manner the copolymers of ethylene with 5-methylene-6-methylbicyclo[2.2.1]hept-2-ene or 5-methylene-6-propylbicyclo[2.2.1]hept-2-ene are produced.

In Table XV below the amounts of reactants charged, the reaction time, and the properties of the copolymer produced are set forth together with two additional runs carried out in a similar manner. The polymerization reaction is also carried out using oxygen as the catalyst.

TABLE XV

| | Run | | |
|---|---|---|---|
| | 1 | 2 | 3 |
| 5-methylenebicyclo[2.2.1]-hept-2-ene, g | 20 | 79 | 42 |
| Wt. percent based on monomers charged | 4.56 | 17.7 | 9.49 |
| Benzene, g | 500 | 500 | 505 |
| Di-tertiary-butyl peroxide, ml. of 1 wt. percent solution in benzene | 2 | 4 | 4 |
| Reaction time, hrs | 5 | 6 | 2 |
| Yield, g | 81 | 37 | 67 |
| Specific viscosity | 0.81 | 0.17 | 0.63 |
| Melt index, dgm./min | 0.007 | 600 | 0.072 |
| Flow rate, dgm./min | 0.24 | | 2.0 |
| Density, g./ml | 0.9254 | 0.9294 | 0.9188 |
| Stiffness modulus, 25° C., p.s.i.×10⁻³ | 10.5 | 2.20 | 7.20 |
| Tensile strength, p.s.i.×10⁻³ | 2.29 | 0.41 | 2.79 |
| Elongation, percent | 670 | 210 | 1,030 |
| 5-methylenebicyclo[2.2.1]-hept-2-ene in resin, wt. percent | 3.3 | 15.0 | 7.4 |

EXAMPLE 38

In a manner similar to that described in Example 37 in the same autoclave, a series of runs was performed at 15,000 p.s.i.g. and 160° C. to produce the copolymer of ethylene/5-vinylbicyclo[2.2.1]hept-2 - ene. The reaction conditions and results are tabulated in Table XVI.

The 5-vinylbicyclo[2.2.1]hept-2-ene copolymerized in the polymer molecule as units of the following formulae

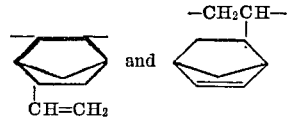

In similar manner the copolymers of ethylene with 5-vinyl-6-ethylbicyclo[2.2.1]hept-2-ene, 5-(5 - hexenyl)-6-methylbicyclo[2.2.1]hept-2-ene, 5-allyl - 5-methylbicyclo[2.2.1]hept-2-ene, or 5-propenylbicyclo[2.2.1]hept-2-ene are produced.

TABLE XVI

| | Run | | | | | |
|---|---|---|---|---|---|---|
| | 1 | 2 | 3 | 4 | 5 | 6 |
| 5-vinylbicyclo[2.2.1]hept-2-ene, parts by weight | 20 | 62.1 | 20 | 27 | 27 | 27 |
| Benzene, g | 475 | 475 | 200 | 250 | 250 | 250 |
| Water, g | | | 435 | | | |
| Di-tertiary-butyl peroxide, ml. of 1 wt. percent solution in benzene | 2.0 | 2.5 | 2.0 | 4 | 4 | 4 |
| Reaction time, hours | 6 | 6 | 6 | 1.5 | 2.6 | 2.7 |
| Yield, g | 19 | 10 | 13 | 32 | 27 | 31 |
| Specific viscosity | 0.162 | 0.052 | 0.175 | | | |
| Melt index, dgm./min | 10,000 | | | 450 | 58 | 850 |
| Flow rate, dgm./min | | | | | 430 | |
| Density, g./ml | | | | 0.9656 | 0.9368 | 0.9338 |
| Stiffness modulus, 25° C., p.s.i.×$10^{-3}$ | | | | 38.2 | 24.7 | 25.4 |
| Tensile strength, p.s.i.×$10^{-3}$ | | | | 1.49 | 1.37 | 1.19 |
| Elongation, percent | | | | 30 | 120 | 70 |

EXAMPLE 39

In a manner similar to that described in Example 37 in the same autoclave, five runs were performed at 15,000 p.s.i.g. to produce the copolymer of ethylene/bicyclo[2.2.1]hept - 5-en-2-methyl acrylate. The reactions conditions and results are tabulated in Table XVII.

In a similar manner the copolymers of ethylene with bicyclo[2.2.1]hept-5-en-2-yl methacrylate, bicyclo[2.2.1]hept-5-en-2-butyl acrylate, bicyclo[2.2.1]hept - 5-en-2-propyl methacrylate, or 6-methylbicyclo[2.2.1]hept-5-en-2-yl acrylate are produced.

TABLE XVII

| | Run | | | | |
|---|---|---|---|---|---|
| | 1 | 2 | 3 | 4 | 5 |
| Bicyclo[2.2.1]hept-5-en-2-methyl acrylate, g | 4.0 | 7.5 | 4.0 | 4.0 | 7.5 |
| Benzene, g | 500 | 500 | 500 | 500 | 500 |
| Di-tertiary-butyl peroxide, ml. of 1.0 wt. percent solution in benzene | 0.5 | 1.0 | 1.0 | 0.5 | 0.5 |
| Temperature, °C | 160 | 160 | 160 | 160 | 160 |
| Reaction time, hours | 2.1 | 5.0 | 0.3 | 1.1 | 2.9 |
| Yield, g | 59 | 66 | [1] 87 | [1] 94 | 57 |
| Melt index, dgm./min | 0 | 0 | 0 | 0 | 0 |
| Density, g./cc | 0.9190 | 0.9236 | 0.9218 | 0.9260 | 0.9234 |
| Stiffness modulus, p.s.i.×$10^{-3}$ | 12.7 | 7.86 | 12.1 | 11.4 | 12.4 |
| Elongation, percent | 330 | 400 | 380 | 230 | 500 |
| Bicyclo[2.2.1]hept-5-en-2-methyl acrylate in resin, wt. percent | 3.0 | 11.6 | 9.3 | 8.1 | 4.6 |

[1] Some resin lost on dumping autoclave.

The bicyclo[2.2.1]hept-5-ene-2 - methyl acrylate copolymerized in the polymer molecule as units of the following formulae:

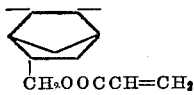

and

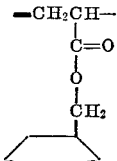

In addition to the copolymers produced as set forth in the above examples, copolymers of ethylene with other bicycloheptene compounds were produced. The reaction conditions were similar to those used in Example 1 and are summarized together with the results of each copolymerization in Table XVIII. In each instance copolymerization occurred across the double bond, without ring scission and with the formation of the bicycloheptanylene moiety in the polymer chain.

TABLE XVIII

| | Example | | | | | | | | |
|---|---|---|---|---|---|---|---|---|---|
| | 40 A | 41 B | 42 C | 43 C | 44 D | 45 E | 46 F | 47 F | 48 G |
| Bicycloheptane comonomer | | | | | | | | | |
| Grams | 4.97 | 4.95 | 4.95 | 1.0 | 5.6 | 4.7 | 20.1 | 5.51 | 14.1 |
| Benzene, grams | 124 | 124 | 124 | 128 | 56 | [2] 47 | 52 | 55 | 11 8 |
| Water, grams | | | | | 122 | 93 | 112 | 120 | |
| Temperature, °C | 160 | 160 | 160 | 160 | 160 | 70 | 160 | 160 | 160 |
| Pressure, p.s.i.g.×$10^{-3}$ | 15 | 15 | 15 | 15 | 15 | 15 | 15 | 15 | 15 |
| Reaction time, hours | 6.8 | 1.0 | 4 | 0.7 | 4 | 7.8 | 4.9 | 1.3 | 5.5 |
| Yield, grams | 123 | 130 | 19 | 91 | 61 | 123 | 101 | 123 | 17 |
| Melt index, dgm./min | 0 | 0 | 600 | 0 | 1.18 | | 117 | 0.72 | 275 |
| Flow rate, dgm./min | 0 | 0 | | | 15 | | | 7.2 | |
| Density, g./cc | 0.9410 | 0.9274 | 1.016 | 0.9258 | 0.9258 | | 0.9920 | 0.9356 | 0.9532 |
| Stiffness modulus, p.s.i.×$10^{-3}$ | 14.6 | 15.1 | 2.4 | 15.1 | [1] 15.9 | | 17.3 | 16.1 | 4.3 |
| Tensile strength, p.s.i.×$10^{-3}$ | 2.20 | 2.23 | 0.68 | 2.16 | 2.19 | | 2.30 | 3.13 | 1.27 |
| Elongation, percent | 330 | 430 | 430 | 490 | 886 | | 840 | 850 | 640 |
| Specific viscosity | | | 0.11 | | 0.486 | 0.183 | 0.252 | 0.604 | |
| Bicycloheptene comonomer in copolymer, percent | 2.2 | 7.9 | 50 | 2.3 | | 7.8 | 20.2 | 5.5 | |

A=bis(bicyclo[2.2.1]hept-5-en-2-yl)sulfone.
B=bicyclo[2.2.1]hept-5-en-2-methyl bicyclo[2.2.1]hept-5-en-2-carboxylate.
C=bis(bicylco[2.2.1]hept-5-en-2-methyl)maleate.
D=tetracyclo[6.2.1.1$^{3,6}$.0$^{2,7}$]-4-dodecene.
E=9-(aminomethyl)tetracyclo[6.2.1.1$^{3,6}$.0$^{2,7}$]-4-dodecene.
F=3,4,5,6,12,12-hexachlorotetracyclo[6.2.1.1$^{3,6}$.0$^{2,7}$]dodeca-4,9-diene.
G=tetracyclo[6.2.1.1$^{3,6}$.0$^{2,7}$]dodeca-4,9-diene.
[1] At 22° C.
[2] t. Butanol used; catalyst was azo-bis-isobutyronitrile.

What is claimed is:
1. A process for producing a copolymer of ethylene and bicyclo[2.2.1]hept-2-ene of the formula

wherein R, when taken singly, is a member selected from the group consisting of a hydrogen atom, an alkyl group containing from 1 to 18 carbon atoms, a phenyl group, and an R' group; R', when taken singly, represents a Z group, a Z-substituted cycloalkyl group containing from 4 to 7 carbon atoms in said cycloalkyl ring, and a Z-substituted alkyl group wherein the alkyl group contains up to 12 carbon atoms, said R' containing not more than two Z groups and not more than 22 carbon atoms therein; and R and R', when taken jointly, form a three-membered heterocyclic divalent group attached to the bicyclo moiety, said divalent group containing carbon and not more than two hetero atoms from the group consisting of oxygen, nitrogen, and sulfur; and wherein Z is a member selected from the group consisting of (a) a halogen atom, (b) an —OR''' group, (c) a cyano group, (d) an isocyanato group, (e) an —OOCR'' group wherein R'' is a member selected from the group of an alkyl group containing from 1 to about 18 carbon atoms, a halogen atom, and an —NH$_2$ group, (f) an —NR'''$_2$ group wherein R''' is a member selected from the group of a hydrogen atom, an alkyl group containing from 1 to about 18 carbon atoms, and a cycloalkyl group containing from 4 to 7 ring carbons, (g) a —CONR'''$_2$ group, (h) a —COOR''' group, (i) a —COX group wherein X is a member selected from the group of a halogen atom and an alkyl group containing from 1 to about 10 carbon atoms, (j) an acetal group —CH(OR'''')$_2$ wherein R'''' is an alkyl group containing from 1 to about 10 carbon atoms, (k) an —SR''''

and

group, (l) an

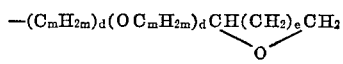

group wherein $m$ is an integer having a value of from 1 to about 4, $d$ is an integer having a value of 0 and 1, and $e$ is an integer having a value of from 0 to 2, and (m) an

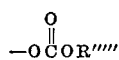

group wherein R''''' is a member selected from the group consisting of an alkyl group containing 1 to 10 carbon atoms and phenyl; which comprises polymerizing a mixture of ethylene and said bicyclo[2.2.1]hept-2-ene at a pressure of at least 500 atmospheres and a temperature of at least 40° C. in contact with a catalytic amount of a free radical catalyst, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

2. A process for producing a copolymer of ethylene and bicyclo[2.2.1]hept-2-ene of the formula

wherein R, when taken singly, is a member selected from the group consisting of a hydrogen atom, an alkyl group containing from 1 to 18 carbon atoms, a phenyl group, and an R' group; R', when taken singly, represents a Z group, a Z-substituted cycloalkyl group containing from 4 to 7 carbon atoms in said cycloalkyl ring, and a Z-substituted alkyl group wherein the alkyl group contains up to 12 carbon atoms, said R' containing not more than two Z groups and not more than 22 carbon atoms therein; and R and R', when taken jointly, form a three-membered heterocyclic divalent group attached to the bicyclo moiety, said divalent group containing carbon and not more than two hetero atoms from the group consisting of oxygen, nitrogen, and sulfur; and wherein Z is a member selected from the group consisting of (a) a halogen atom, (b) an —OR''' group, (c) a cyano group, (d) an isocyanato group, (e) an —OOCR'' group wherein R'' is a member selected from the group of an alkyl group containing from 1 to about 18 carbon atoms, a halogen atom, and an —NH$_2$ group, (f) an —NR'''$_2$ group wherein R''' is a member selected from the group of a hydrogen atom, an alkyl group containing from 1 to about 18 carbon atoms, and a cycloalkyl group containing from 4 to 7 ring carbon atoms, (g) a —CONR'''$_2$ group, (h) a —COOR''' group, (i) a —COX group wherein X is a member selected from the group of a halogen atom and an alkyl group containing from 1 to about 10 carbon atoms, (j) an acetal group —CH(OR'''')$_2$ wherein R'''' is an alkyl group containing from 1 to about 10 carbon atoms, (k) an —SR''''

and

group, (l) an

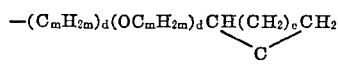

group wherein $m$ is an integer having a value of from 1 to about 4, $d$ is an integer having a value of 0 and 1, and $e$ is an integer having a value of from 0 to 2, and (m) an

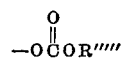

group wherein R''''' is a member selected from the group consisting of an alkyl group containing 1 to 10 carbon atoms and phenyl; which comprises polymerizing a mixture of ethylene and from 0.1 to 50 percent by weight of said substituted bicyclo[2.2.1]hept-2-ene, based on the total weight of said monomers, at a pressure of from 500 to 10,000 atmospheres and temperature of from 40° C. to 350° C. in contact with a catalytic amount of a free radical catalyst, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

3. A process for producing a copolymer of ethylene and bicyclo[2.2.1]hept-2-ene selected from the group represented by the formulae

 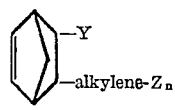

and

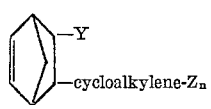

wherein Y represents a member selected from the group consisting of a hydrogen atom, an alkyl group containing from 1 to about 18 carbon atoms, and phenyl; the alkylene radical contains from 1 to about 12 carbon atoms; the cycloalkylene radical contains from 4 to 7 carbon atoms; $n$ is an integer having a value of 1 and 2; and Z represents a member selected from the group consisting of (a) a hologen atom, (b) an —OR''' group, (c) a cyano group, (d) an isocyanato group, (e) an —OOCR'' group wherein R'' is a member selected from the group of an alkyl group containing from 1 to about 18 carbon atoms, a halogen atom, and an —NH₂ group, (f) an —NR'''₂ group wherein R''' is a member selected from the group of a hydrogen atom, an alkyl group containing from 1 to about 18 carbon atoms, and a cycloalkyl group containing from 4 to 7 ring carbons, (g) a —CONR'''₂ group (h) a —COOR''' group, (i) a —COX group wherein X is a member selected from the group of a halogen atom and an alkyl group containing from 1 to about 10 carbon atoms, (j) an acetal group —CH(OR'''')₂ wherein R'''' is an alkyl group containing from 1 to about 10 carbon atoms, (k) an —SR'''',

and

group, and (l) an

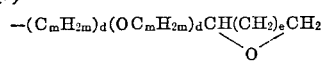

group wherein $m$ is an integer having a value of from 1 to about 4, $d$ is an integer having a value of 0 and 1, and $e$ is an integer having a value of from 0 to 2, and (m) an

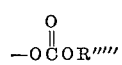

group wherein R''''' is a member selected from the group consisting of an alkyl group containing 1 to 10 carbon atoms and phenyl; which comprises polymerizing a mixture of ethylene and said bicyclo[2.2.1]hept-2-ene at a pressure of at least 500 atmospheres and a temperature of at least 40° C. in contact with a catalytic amount of a free radical catalyst, said copolymer consisting of polymerized —CH₂CH₂— units from said ethylene and polymerized divalent bicycloheptanylene units of the general formula:

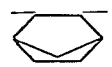

from the bicyclo[2.2.1]hept-2-ene compound in the polymer chain.

4. A process for producing a copolymer of ethylene and 5-cyanoethylbicyclo[2.2.1]hept-2-ene as claimed in claim 1, wherein the 5-cyanoethylbicyclo[2.2.1]hept-2-ene is polymerized in the polymer chain in the form of bicyclo units of the formula

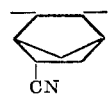

5. A process for producing a copolymer of ethylene and 5-chlorobicyclo[2.2.1]hept-2-ene as claimed in claim 1, wherein the 5-chlorobicyclo[2.2.1]hept-2-ene is polymerized in the polymer chain in the form of bicyclo units of the formula

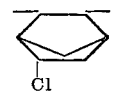

6. A process for producing a copolymer of ethylene and 5-chloromethylbicyclo[2.2.1]hept-2-ene as claimed in claim 1, wherein the 5-chloromethylbicyclo[2.2.1]hept-2-ene is polymerized in the polymer chain in the form of bicyclo units of the formula

7. A process for producing a copolymer of ethylene and 5-hydroxymethylbicyclo[2.2.1]hept-2-ene as claimed in claim 1, wherein the 5-hydroxymethylbicyclo[2.2.1]hept-2-ene is polymerized in the polymer chain in the form of bicyclo units of the formula

8. A process for producing a copolymer of ethylene and 5-isocyanatomethylbicyclo[2.2.1]hept-2-ene as claimed in claim 1, wherein the 5-isocyanatomethylbicyclo[2.2.1]-hept-2-ene is polymerized in the polymer chain in the form of bicyclo units of the formula

9. A process for producing a copolymer of ethylene and bicyclo[2.2.1]hept-5-en-2-yl acetate as claimed in claim 1, wherein the bicyclo[2.2.1]hept-5-en-2-yl acetate is polymerized in the polymer chain in the form of bicyclo units of the formula

10. A process for producing a copolymer of ethylene and bicyclo[2.2.1]hept-5-en-2-yl chloroformate as claimed in claim 1, wherein the bicyclo[2.2.1]hept-5-en-2-ylmethyl chloroformate is polymerized in the polymer chain in the form of bicyclo units of the formula

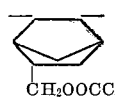

11. A process for producing a copolymer of ethylene and 5-aminomethylbicyclo[2.2.1]hept-2-ene as claimed in claim 1, wherein the 5-aminomethylbicyclo[2.2.1]hept-2-ene is polymerized in the polymer chain in the form of bicyclo units of the formula

12. A process for producing a copolymer of ethylene and 5-carboxybicyclo[2.2.1]hept - 2 - ene as claimed in claim 1, wherein the 5-carboxybicyclo[2.2.1]hept-2-ene is polymerized in the polymer chain in the form of bicyclo units of the formula

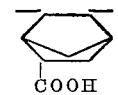

13. A process for producing a copolymer of ethylene and 9-(bicyclo[2.2.1]hept - 5 - en-2-yl)nonanoic acid as claimed in claim 1, wherein the 9-(bicyclo[2.2.1]hept-5-en-2-yl)nonanoic acid is polymerized in the polymer chain in the form of bicyclo units of the formula

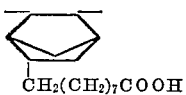

14. A process for producing a copolymer of ethylene and ethyl bicyclo[2.2.1]hept-2-en-5-carboxylate as claimed in claim 1, wherein the ethyl bicyclo[2.2.1]hept-2-en-5-carboxylate is polymerized in the polymer chain in the form of bicyclo units of the formula

15. A process for producing a copolymer of ethylene and bicyclo[2.2.1]hept-5-en-2-carboxamide as claimed in claim 1, wherein the bicyclo[2.2.1]hept-5-en-2-carboxamide is polymerized in the polymer chain in the form of bicyclo units of the formula

16. A process for producing a copolymer of ethylene and N,N-dimethylbicyclo[2.2.1]hept-5-en-2-carboxamide as claimed in claim 1, wherein the N,N-dimethylbicyclo[2.2.1]hept-5-en-2-carboxamide is polymerized in the polymer chain in the form of bicyclo units of the formula

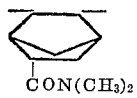

17. A process for producing a copolymer of ethylene and 5-epoxyethylbicyclo[2.2.1]hept-2-ene as claimed in claim 1, wherein the 5-epoxyethylbicyclo[2.2.1]hept-2-ene is polymerized in the polymer chain in the form of bicyclo units of the formula

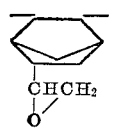

18. A process for producing a copolymer of ethylene and bicyclo[2.2.1]hept-5-en-2-methyl glycidyl ether as claimed in claim 1, wherein the bicyclo[2.2.1]hept-5-en-2-methyl glycidyl ether is polymerized in the polymer chain in the form of bicyclo units of the formula

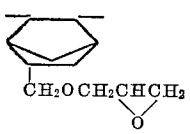

19. A process for producing a copolymer of ethylene and 2,3 - epoxypropylbicyclo[2.2.1]hept - 5 - en - 2 - carboxylate as claimed in claim 1, wherein the 2,3-epoxypropylbicyclo[2.2.1]hept-5-en-2-carboxylate is polymerized in the polymer chain in the form of bicyclo units of the formula

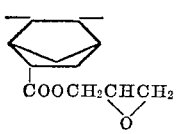

20. A process for producing a copolymer of ethylene and 2 - dimethylaminoethyl bicyclo[2.2.1]hept - 5 - en - 2 - yl-methylcarbamate as claimed in claim 1, wherein the 2 - dimethylaminoethyl bicyclo[2.2.1]hept - 5 - en - 2 - yl-methylcarbamate is polymerized in the polymer chain in the form of bicyclo units of the formula

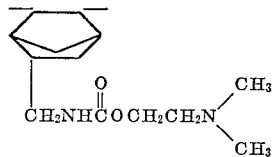

21. A process for producing a copolymer of ethylene and bicyclo[2.2.1]hept - 2 - ene selected from the group represented by the formulae

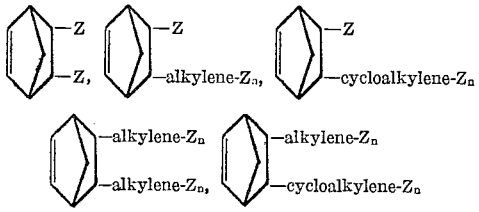

and

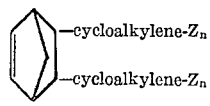

wherein the alkylene radical contains from 1 to about 12 carbon atoms; the cycloalkylene radical contains from 4 to 7 carbon atoms; $n$ is an integer having a value of 1 and 2; and Z represents a member selected from the group consisting of (a) a halogen atom, (b) an —OR''' group, (c) a cyano group, (d) an isocyanato group, (e) an —OOCR'' group wherein R'' is a member selected from the group of an alkyl group containing from 1 to about 18 carbon atoms, a halogen atom, and an —NH$_2$ group, (f) an —NR$_2$''' group wherein R''' is a member selected from the group of a hydrogen atom, an alkyl group containing from 1 to about 18 carbon atoms, and a cycloalkyl group containing from 4 to 7 ring carbons, (g) a —CONR$_2$''' group, (h) a —COOR''' group, (i) a —COX group wherein X is a member selected from the group of a halogen atom and an alkyl group containing from 1 to about 10 carbon atoms, (j) an acetal group —CH(OR'''')$_2$ wherein R'''' is an alkyl group containing from 1 to about 10 carbon atoms, (k) an —SR'''', $$-\overset{\text{O}}{\underset{\|}{S}}R''''$$

and $$-\overset{\text{O}}{\underset{\|}{S}}R''''$$

group, (l) an $$-(C_mH_{2m})_d(O C_mH_{2m})_d CH(CH_2)_e CH_2 \diagdown O \diagup$$

group wherein $m$ is an integer having a value of from 1 to about 4, $d$ is an integer having a value of 0 and 1, and $e$ is an integer having a value of from 0 to 2, and (m) an $$-O\overset{\text{O}}{\underset{\|}{C}}OR'''''$$

group wherein R''''' is a member selected from the group consisting of an alkyl group containing 1 to 10 carbon atoms and phenyl; which comprises polymerizing a mixture of ethylene and said bicyclo[2.2.1]hept-2-ene at a pressure of at least 500 atmospheres and a temperature of at least 40° C. in contact with a catalytic amount of a free radical catalyst, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

22. A process for producing a copolymer of ethylene and 5,6-di - (chloromethyl) - bicyclo[2.2.1]hept-2-ene as claimed in claim 1, wherein the 5,6-di-(chloromethyl)-bicyclo[2.2.1]hept-2-ene is polymerized in the polymer chain in the form of bicyclo units of the formula

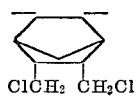

23. A process for producing a copolymer of ethylene and 5,6-di-(hydroxymethyl)-bicyclo[2.2.1]hept - 2 - ene as claimed in claim 1, wherein the 5,6-di-(hydroxymethyl)-bicyclo [2.2.1]hept-2-ene is polymerized in the polymer chain in the form of bicyclo units of the formula

24. A process for producing a copolymer of ethylene and bicyclo[2.2.1]hept-2-enes selected from the group having the formula

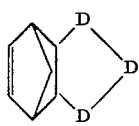

wherein D is a member selected from the group consisting of carbon, oxygen, nitrogen, and sulfur atoms and wherein at least 1 and not more than 2 of said D atoms is a carbon atom; which comprises polymerizing a mixture of ethylene and said bicyclo[2.2.1]hept-2-ene at a pressure of at least 500 atmospheres and a temperature of at least 40° C. in contact with a catalytic amount of a free radical catalyst, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

25. A process for producing a copolymer of ethylene and bicyclo[2.2.1]hept-5-en-2,3-dicarboxylic anhydride as claimed in claim 1, wherein the bicyclo[2.2.1]hept-5-en-2,3-dicarboxylic anhydride is polymerized in the polymer chain in the form of units of the formula.

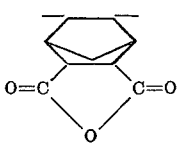

26. A process for producing a copolymer of ethylene and bicyclo[2.2.1]hept-5-en-2,3-dicarboximide as claimed in claim 1, wherein the bicyclo[2.2.1]hept-5-en-2,3-dicarboximide is polymerized in the polymer chain in the form of units of the formula

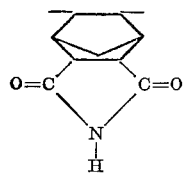

27. A process for producing a copolymer of ethylene and N - (2-cyanoethyl)bicyclo[2.2.1]hept-5-en-2,3-dicarboximide as claimed in claim 1, wherein the N-(2-cyanoethyl)bicyclo[2.2.1]hept-5-en - 2,4 - dicarboximide is polymerized in the polymer chain in the form of units of the formula

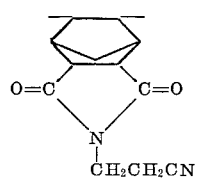

28. A process for producing a copolymer of ethylene and 1,1-dioxotetrahydrothien-3-yl bicyclo[2.2.1]hept-5-en-2-ylmethyl ether as claimed in claim 1, wherein the 1,1-dioxotetrahydrothien - 3 - yl-bicyclo[2.2.1]hept-5-en-2-ylmethyl ether is polymerized in the polymer chain in the form of units of the formula

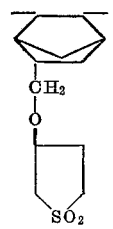

29. A copolymer of ethylene and bicyclo[2.2.1]-hept-2-ene of the formula

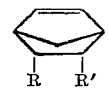

wherein R, when taken singly, is a member selected from the group consisting of a hydrogen atom, an alkyl group containing from 1 to 18 carbon atoms, a phenyl group, and an R' group; R', when taken singly, represents a Z group, a Z-substituted cycloalkyl group containing from 4 to 7 carbon atoms in said cycloalkyl ring, and a Z-substituted alkyl group wherein the alkyl group contains up to 12 carbon atoms, said R' containing not more than two Z groups and not more than 22 carbon atoms therein; and R and R', when taken jointly, form a three-membered heterocyclic divalent group attached to the bicyclo moiety, said divalent group containing carbon and not more than two hetero atoms from the group consisting of oxygen, nitrogen and sulfur; and wherein Z is a member selected from the group consisting of (a) a halogen atom, (b) an —OR''' group, (c) a cyano group, (d) an isocyanato group, (e) an —OOCR'' group wherein R'' is a member selected from the group of an alkyl group, containing from 1 to about 18 carbon atoms, a halogen atom, and an —NH$_2$ group, (f) an —NR'''$_2$ group wherein R''' is a member selected from the group of a hydrogen atom, an alkyl group containing from 1 to about 18 carbon atoms, and a cycloalkyl group containing from 4 to 7 ring carbons, (g) a —CONR'''$_2$ group, (h) a —COOR''' group, (i) a —COX group wherein X is a member selected from the group of a halogen atom and an alkyl group containing from 1 to about 10 carbon atoms, (j) an acetal group —CH(OR'''')$_2$ wherein R'''' is an alkyl group containing from 1 to about 10 carbon atoms, (k) an —SR'''',

and

group, (l) an

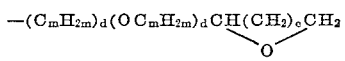

group wherein $m$ is an integer having a value of from 1 to about 4, $d$ is an integer having a value of 0 and 1, and $e$ is an integer having a value of from 0 to 2, and (m) an

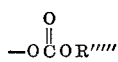

group wherein R''''' is a member selected from the group consisting of an alkyl group containing 1 to 10 carbon atoms and phenyl; said copolymer consisting of polymerized —CH$_2$CH$_2$— units and polymerized bicyclo units of the formula

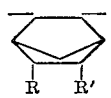

in the polymer chain.

30. A copolymer of ethylene and a bicyclo[2.2.1]-hept-2-ene selected from the group represented by the formulae

 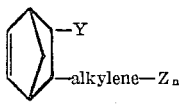

and

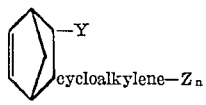

wherein Y represents a member selected from the group consisting of a hydrogen atom, an alkyl group containing from 1 to about 18 carbon atoms, and phenyl; the divalent alkylene radical contains from 1 to about 12 carbon atoms; the cycloalkylene radical contains from 4 to 7 carbon atoms; $n$ is an integer having a value of 1 and 2; and Z represents a member selected from the group consisting of (a) a halogen atom, (b) an —OR''' group, (c) a cyano group, (d) an isocyanato group, (e) an —OOCR'' group wherein R'' is a member selected from the group of an alkyl group containing from 1 to about 18 carbon atoms, a halogen atom, and an —NH$_2$ group, (f) an —NR'''$_2$ group wherein R''' is a member selected from the group of a hydrogen atom, an alkyl group containing from 1 to about 18 carbon atoms, and a cycloalkyl group containing from 4 to 7 ring carbons, (g) a —CONR'''$_2$ group, (h) a —COOR''' group, (i) a —COX group wherein X is a member selected from the group of a halogen atom and an alkyl group containing from 1 to about 10 carbon atoms, (j) an acetal group

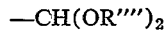

wherein R'''' is an alkyl group containing from 1 to about 10 carbon atoms, (k) an —SR'''',

and

group, (l) an

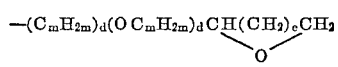

group wherein $m$ is an integer having a value of from 1 to about 4, $d$ is an integer having a value of 0 and 1, and $e$ is an integer having a value of from 0 to 2, and (m) an

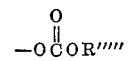

group wherein R''''' is a member selected from the group consisting of an alkyl group containing 1 to 10 carbon atoms and phenyl; said copolymer consisting of polymerized —CH$_2$CH$_2$— units and polymerized divalent bicyclo units from said bicyclo[2.2.1]hept-2-ene in the polymer chain.

31. A copolymer of ethylene and 5 - cyanobicyclo [2.2.1]hept-2-ene consisting of polymerized —CH$_2$CH$_2$— units and polymerized bicyclo units of the formula

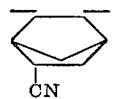

in the polymer chain.

32. A polymer of ethylene and 5-chlorobicyclo[2.2.1] hept-2-ene consisting of polymerized —CH$_2$CH$_2$— units and polymerized bicyclo units of the formula

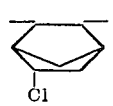

in the polymer chain.

33. A copolymer of ethylene and 5-chloromethylbicyclo[2.2.1]hept-2-ene consisting of polymerized

—CH$_2$CH$_2$— units and polymerized bicyclo units of the formula

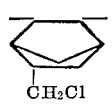

in the polymer chain.

34. A copolymer of ethylene and 5-hydroxymethylbicyclo[2.2.1]hept-2-ene consisting of polymerized

—CH$_2$CH$_2$— units and polymerized bicyclo units of the formula

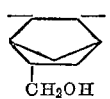

in the polymer chain.

35. A copolymer of ethylene and 5-isocyanato methyl bicyclo[2.2.1]hept-2-ene consisting of polymerized

—CH$_2$CH$_2$— units and polymerized bicyclo units of the formula

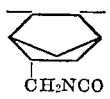

in the polymer chain.

36. A copolymer of ethylene and bicyclo[2.2.1]hept-5-en-2-yl acetate consisting of polymerized —CH$_2$CH$_2$— units and polymerized bicyclo units of the formula

[bicyclo structure with OOCCH₃ substituent]

in the polymer chain.

37. A copolymer of ethylene and bicyclo[2.2.1]hept-5-en-2-ylmethyl chloroformate consisting of polymerized —CH₂CH₂— units and polymerized bicyclo units of the formula

[bicyclo structure with CH₂OOCCl substituent]

in the polymer chain.

38. A copolymer of ethylene and 5-aminoethylbicyclo[2.2.1]hept-2-ene consisting of polymerized —CH₂CH₂— units and polymerized bicyclo units of the formula

[bicyclo structure with CH₂NH₂ substituent]

in the polymer chain.

39. A copolymer of ethylene and 5 - carboxybicyclo[2.2.1]hept-2-ene consisting of polymerized —CH₂CH₂— units and polymerized bicyclo units of the formula

[bicyclo structure with COOH substituent]

in the polymer chain.

40. A copolymer of ethylene and 9 - (bicyclo[2.2.1]hept-2-en-yl)nonanoic acid consisting of polymerized

—CH₂CH₂— units and polymerized bicyclo units of the formula

[bicyclo structure with CH₂(CH₂)₇COOH substituent]

in the polymer chain.

41. A copolymer of ethylene and ethyl bicyclo[2.2.1]hept-2-en-5-carboxylate consisting of polymerized

—CH₂CH₂— units and polymerized bicyclo units of the formula

[bicyclo structure with COOC₂H₅ substituent]

in the polymer chain.

42. A copolymer of ethylene and bicyclo[2.2.1]hept-5-en-2-carboxamide consisting of polymerized

—CH₂CH₂— units and polymerized bicyclo units of the formula

[bicyclo structure with CONH₂ substituent]

in the polymer chain.

43. A copolymer of ethylene and N,N-dimethyl-bicyclo[2.2.1]hept-5-en-2-carboxamide consisting of polymerized —CH₂CH₂—, units and polymerized bicyclo units of the formula

[bicyclo structure with CON(CH₃)₂ substituent]

in the polymer chain.

44. A copolymer of ethylene and 5-epoxyethyl-bicyclo[2.2.1]hept-2-ene consisting of polymerized —CH₂CH₂— units and polymerized bicyclo units of the formula.

[bicyclo structure with CHCH₂ epoxide substituent]

in the polymer chain.

45. A copolymer of ethylene and bicyclo[2.2.1]hept-2-en-5-methyl glycidyl ether consisting of poylmerized —CH₂CH₂—units and polymerized bicyclo units of the formula

[bicyclo structure with CH₂OCH₂CHCH₂ epoxide substituent]

in the polymer chain.

46. A copolymer of ethylene and 2,3-epoxypropyl-bicyclo[2.2.1]hept-5-en-2-carboxylate consisting of polymerized —CH₂CH₂— units and polymerized bicyclo units of the formula

[bicyclo structure with COOCH₂CHCH₂ epoxide substituent]

in the polymer chain.

47. A copolymer of ethylene and 2-dimethylaminoethyl bicyclo[2.2.1]hept-5-en-2-ylmethylcarbamate consisting of polymerized —CH₂CH₂— units and polymerized bicyclo units of the formula

[bicyclo structure with CH₂NHCOCH₂N(CH₃)₂ substituent]

in the polymer chain.

48. A copolymer of ethylene and bicyclo[2.2.1]hept-2-ene selected from the group represented by the formula

[six bicyclo structural formulas with substituents: —Z,—Z; —Z,—alkylene—Z$_n$; —Z,—cycloalkylene—Z$_n$; —alkylene—Z$_n$,—alkylene—Z$_n$; —alkylene—Z$_n$,—cycloalkylene—Z$_n$, and —cycloalkylene—Z$_r$,—cycloalkylene—Z$_n$]

wherein the divalent alkylene radical contains from 1 to about 12 carbon atoms; the divalent cycloalkylene radical contains from 4 to 7 carbon atoms; $n$ is an integer having having a value of 1 and 2; and Z represents a member selected from the group consisting of (a) a halogen atom, (b) an —OR″ group, (c) a cyano group, (d) an isocyanato group, (e) an —OOCR'' group wherein R'' is an alkyl group containing from 1 to about 18 carbon atoms, a halogen atom and an —NH₂ group, (f) an —NR'''₂ group wherein R''' is a member selected from the group of a hydrogen atom, an alkyl group containing from 1 to about 18 carbon atoms, and a cycloalkyl group containing from 4 to 7 ring carbons, (g) a —CONR'''₂ group, (h) a —COOR''' group, (i) a —COX group wherein X is a member selected from the group of a halogen atom and an alkyl group containing from 1 to about 10 carbon atoms, (j) an acetal group

—CH(OR'''')₂ wherein R'''' is an alkyl group containing from 1 to about 10 carbon atoms, (k) an —S''''

and

group, (l) an

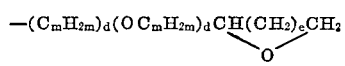

group wherein m is an integer having a value of from 1 to about 4, d is an integer having a value of 0 and 1, and e is an integer having a value of from 0 to 2, and (m) an

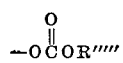

group wherein R'''' is a member selected from the group consisting of an alkyl group containing 1 to 10 carbon atoms and phenyl, said copolymer consisting of polymerized —CH₂CH₂— units from said ethylene and polymerized divalent bicycloheptanylene units of the general formula:

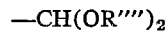

from the bicyclo[2.21]hept-2-ene compound in the polymer chain.

49. A copolymer of ethylene and 5,6-di-(chloromethyl)-bicyclo[2.2.1]hept-2-ene consisting of polymerized —CH₂CH₂— units and polymerized bicyclo units of the formula

in the polymer chain.

50. A copolymer of ethylene and 5,6-di-(hydroxymethyl)-bicyclo[2.2.1]hept-2-ene consisting of polymerized —CH₂CH₂— units and polymerized bicyclo units of the formula

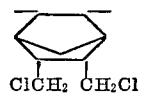

in the polymer chain.

51. A copolymer of ethylene and bicyclo[2.2.1]hept-2-enes selected from the group having the formula

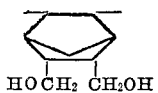

wherein D is a member selected from the group consisting of carbon oxygen, nitrogen, and sulfur atoms and wherein at least 1 and not more than 2 of said D atoms is a carbon atom., said copolymer consisting of polymerized —CH₂CH₂— units from said ethylene and polymerized divalent bicycloheptanylene units of the general formula:

from the bicyclo[2.2.1]hept-2-ene compound in the polymer chain.

52. A copolymer of ethylene and bicyclo[2.2.1]hept-5-ene-2,3-dicarboxylic anhydride consisting of polymerized units of the formula

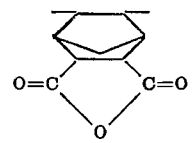

in the polymer chain.

53. A copolymer of ethylene and bicyclo[2.2.1]hept-5-en-2,3-dicarboximide consisting of polymerized

—CH₂CH₂— units and polymerized units of the formula

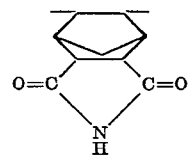

in the polymer chain.

54. A copolymer of ethylene and N-(2-cyanoethyl)-bicyclo[2.2.1]hept-5-en-2,3-dicarboximide consisting of polymerized —CH₂CH₂— units and polymerized units of the formula

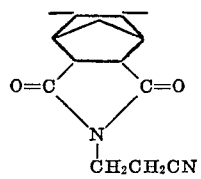

in the polymer chain.

55. A copolymer of ethylene and 1,1-dioxotetrahydrothien-3-yl bicyclo[2.2.1]hept-5-en-2-ylmethyl ether consisting of polymerized —CH₂CH₂— units and polymerized units of the formula

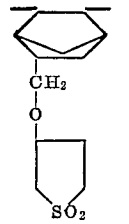

in the polymer chain.

56. A process for producing a copolymer of ethylene and a bicyclo [2.2.1]-2-heptene of the formula:

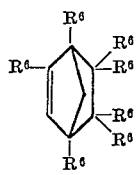

wherein R⁶ is a member selected from the group consisting of a hydrogen atom and a hydrocarbyl radical containing up to 15 carbon atoms selected from the group consisting of an alkyl radical, an aryl radical, an aralkyl radical, an alkaryl radical, and a cycloalky radical, which comprises polymerizing a mixture of ethylene and said bicyclo [2.2.1]-2-heptene at a pressure of at least 500 atmospheres and a temperature of at least 40° C., in contact with a catalytic amount of a free radical catalyst, said copolymer consisting of polymerized —CH₂CH₂— units from said ethylene and polymerized divalent bicycloheptanylene units of the general formula:

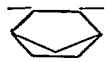

from the bicyclo [2.2.1]hept-2-ene compound in the polymer chain.

57. A process for producing a copolymer of ethylene and a bicyclo [2.2.1]-2-heptene of the formula:

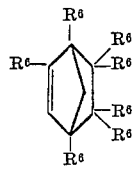

wherein R⁶ is a member selected from the group consisting of a hydrogen atom and a hydrocarbyl radical containing up to 15 carbon atoms selected from the group consisting of an alkyl radical, an aryl radical, an aralkyl radical, an alkaryl radical, and cycloalkyl radical, which comprises polymerizing a mixture of ethylene and from 0.1 to 50 percent by weight of said bicyclo [2.2.1]-2-heptene, based on the total weight of said monomers, at a pressure from 500 to 10,000 atmospheres and a temperature from 40° C. to 350° C., in contact with a catalytic amount of a free radical catalyst, said copolymer consisting of polymerized —CH₂CH₂— units from said ethylene and polymerized divalent bicycloheptanylene units of the general formula:

from the bicyclo[2.2.1]hept-2-ene compound in the polymer chain.

58. A process for producing a copolymer of ethylene and 5-methylbicyclo[2.2.1]-2-heptene as claimed in claim 56, wherein the 2-methylbicyclo[2.2.1]-2-heptene is polymerized in the polymer chain in the form of methylbicycloheptanylene units of the formula:

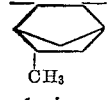

59. A process for producing a copolymer of ethylene and 5-phenylbicyclo[2.2.1]-2-heptene as claimed in claim 56, wherein the 2-methylbicyclo[2.2.1]-2-heptene is polymerized in the polymer chain in the form of phenylbicycloheptanylene units of the formula:

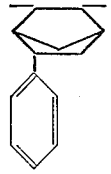

60. A process for producing a copolymer of ethylene and 5,5-dimethylbicyclo[2.2.1]-2-heptene as claimed in claim 56 wherein the 5,5-dimethylbicyclo[2.2.1]-2-heptene is polymerized in the polymer chain in the form of dimethylbicycloheptanylene units of the formula:

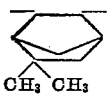

61. A process for producing a copolymer of ethylene and 5,6-dimethylbicyclo[2.2.1]-2-heptene as claimed in claim 56, wherein the 5,6-dimethylbicyclo[2.2.1]-2-heptene is polymerized in the polymer chain in the form of dimethylbicycloheptanylene units of the formula:

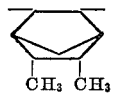

62. A process for producing a copolymer of ethylene and 5-hexylbicyclo[2.2.1]-2-heptene as claimed in claim 56 wherein the 5-hexylbicyclo[2.2.1]-2-heptene is polymerized in the polymer chain in the form of hexylbicycloheptanylene units of the formula:

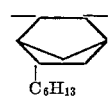

63. A process for producing a copolymer of ethylene and 1,3-diisopropylbicyclo[2.2.1]-2-heptene as claimed in claim 56 wherein the 1,3 - diisopropylbicyclo[2.2.1]-2-heptene is polymerized in the polymer chain in the form of diisopropylbicycloheptanylene units of the formula:

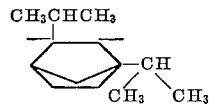

64. A solid copolymer of ethylene and a bicyclo[2.2.1]-2-heptene of the formula:

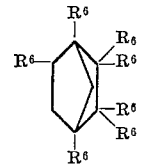

wherein R⁶ is a member selected from the group consisting of a hydrogen atom and a hydrocarbyl radical containing up to 15 carbon atoms selected from the group consisting of an alkyl radical, an aryl radical, an aralkyl radical, an alkaryl radical, and cycloalkyl radical, said copolymer consisting of polymerized —CH₂CH₂— units and polymerized bicycloheptanylene units of the formula:

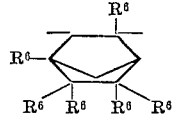

in the polymer chain.

65. A solid copolymer of ethylene and 5-methylbicyclo[2.2.1]-2-heptene consisting of polymerized —CH₂CH₂— units and

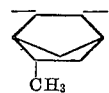

units.

66. A solid copolymer of ethylene and 5-phenylbicyclo[2.2.1] - 2 - heptene consisting of polymerized —CH₂CH₂— units and

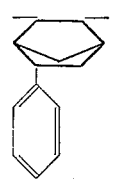

units.

67. A solid copolymer of ethylene and 5,5-dimethyl-bicyclo[2.2.1] - 2 - heptene consisting of polymerized —CH₂CH₂— units and

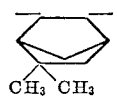

units.

68. A solid copolymer of ethylene and 5,6-dimethyl-bicyclo[2.2.1] - 2 - heptene consisting of polymerized —CH₂CH₂— units and

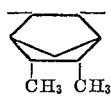

units.

69. A solid copolymer of ethylene and 5-hexylbicyclo-[2.2.1]-2-heptene consisting of polymerized —CH₂CH₂— units and

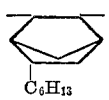

units.

70. A solid copolymer of ethylene and 1,3-diisopropyl-bicyclo[2.2.1] - 2 - heptene consisting of polymerized —CH₂CH₂— units and

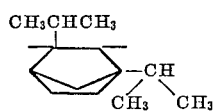

units.

71. A process for producing a copolymer of ethylene and bicyclo[2.2.1]-2-heptene, which consists of polymerizing a mixture of said monomers at a pressure of at least 500 atomspheres and a temperature above 40° C., in contact with a catalytic amount of a free radical catalyst, said copolymer consisting of polymerized —CH₂CH₂— units from said ethylene and polymerized divalent bicycloheptanylene units of the general formula:

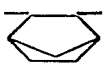

from the bicyclo[2.2.1]hept-2-ene compound in the polymer chain.

72. A process for producing a copolymer of ethylene and bicyclo[2.2.1]-2-heptene, which consists of polymerizing a mixture of said monomers containing from 0.1 to 50 percent by weight of bicyclo[2.2.1]-2-heptene, based on the total weight of said monomers, at a pressure of from 500 to 10,000 atmospheres and a temperature from 40° C. to 350° C., in contact with a catalytic amount of a free radical catalyst, said copolymer consisting of polymerized —CH₂CH₂— units from said ethylene and polymerized divalent bicycloheptanylene units of the general formula:

from the bicyclo[2.2.1]hept-2-ene compound in the polymer chain.

73. A solid copolymer of ethylene and bicyclo[2.2.1]-2-heptene, said copolymer consisting of polymerized

—CH₂CH₂— units and polymerized bicyclo[2.2.1]-2-heptene units in the bicycloheptanylene form

74. A solid copolymer as claimed in claim 73, said copolymer having a density of from 0.90 to 0.935 gram per cc.

75. A process for producing a copolymer of ethylene and bicyclo[2.2.1]hept-2-ene of the formula

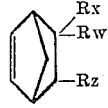

wherein Rx when taken singly is a member selected from the group consisting of a hydrogen atom and an alkyl group having up to 4 carbon atoms; Rw when taken singly is an

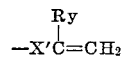

group wherein X' is a member selected from the group consisting of —C$_b$H$_b$— and C$_b$H$_{2b}$OOC— in which $b$ is an integer having a value of from 0 to 4; Ry is a member selected from the group consisting of hydrogen and methyl; Rw and Rx when taken jointly represent =CH₂; and Rz is a member selected from the group consisting of hydrogen and an alkyl group having up to 4 carbon atoms; which comprises polymerizing a mixture of ethylene and said bicyclo[2.2.1]hept-2-ene at a pressure of at least 500 atmospheres and a temperature of at least 40° C. in contact with a catalytic amount of a free radical catalyst, said copolymer consisting of polymerized —CH₂CH₂— units from said ethylene and polymerized divalent bicycloheptanylene units of the general formula:

from the bicyclo[2.2.1]hept-2-ene compound in the polymer chain.

76. A process for producing a copolymer of ethylene and a member selected from the group of bicyclo compounds having the formula

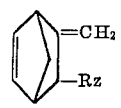

wherein Rz is a member selected from the group consisting of hydrogen and an alkyl group having up to 4 carbon atoms; which comprises polymerizing a mixture of ethylene and from 0.1 to 50 percent by weight of said bicyclo compound, based on the total weight of said monomers, at a pressure of from 500 to 10,000 atmosphereas and a temperature of from 40° C. to 350° C. in contact with a catalytic amount of a free radical catalyst, said copolymer consisting of polymerized —CH₂CH₂— units from said ethylene and polymerized divalent bicycloheptanylene units of the general formula:

from the bicyclo[2.2.1]hept-2-ene compound in the polymer chain.

77. A process for producing a copolymer of ethylene and a member selected from the group of bicyclo compounds having the formula

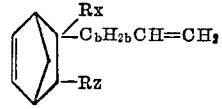

wherein Rx and Rz are each members selected from the group consisting of a hydrogen atom and an alkyl group having up to 4 carbon atoms and $b$ is an integer having a value of from 0 to 4; which comprises polymerizing a mixture of ethylene and from 0.1 to 50 percent by weight of said bicyclo compound, based on the total weight of said monomers, at a pressure of from 500 to 10,000 atmospheres and a temperature of from 40° C. to 350° C. in contact with a catalytic amount of a free radical catalyst, said copolymer consisting of polymerized —$CH_2CH_2$— units from said ethylene and polymerized divalent bicycloheptanylene units of the general formula:

from the bicyclo[2.2.1]hept-2-ene compound in the polymer chain.

78. A process for producing a copolymer of ethylene and a member selected from the group of bicyclo compounds having the formula

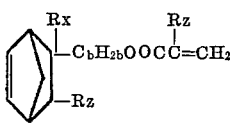

wherein Rx and Rz are each members selected from the group consisting of a hydrogen atom and an alkyl group having up to 4 carbon atoms; $b$ is an integer having a value of from 0 to 4; and R″ is a member selected from the group consisting of hydrogen and methyl; which comprises polymerizing a mixture of ethylene and from 0.1 to 50 percent by weight of said bicyclo compound, based on the total weight of said monomers, at a pressure of from 500 to 10,000 atmospheres and a temperature of from 40° C. to 350° C. in contact with a catalytic amount of a free radical catalyst, said copolymer consisting of polymerized —$CH_2CH_2$— units from said ethylene and polymerized divalent bicycloheptanylene units of the general formula:

from the bicyclo[2.2.1]hept-2-ene compound in the polymer chain.

79. A process for producing a copolymer of ethylene and 5-methylenebicyclo[2.2.1]hept-2-ene as claimed in claim 75.

80. A process for producing a copolymer of ethylene and 5-vinylbicyclo[2.2.1]hept-2-ene as claimed in claim 75.

81. A process for producing a copolymer of ethylene and bicyclo[2.2.1]hept-5-en-2-methylacrylate as claimed in claim 75.

82. A copolymer of ethylene and a bicyclo compound of the formula

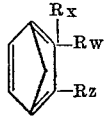

wherein Rx when taken singly is a member selected from the group consisting of a hydrogen atom and an alkyl group having up to 4 carbon atoms; Rw when taken singly is an

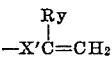

group wherein X′ is a member selected from the group consisting of —$C_bH_{2b}$— and —$C_bH_{2b}OOC$— in which $b$ is an integer having a value of from 0 to 4; Ry is a member selected from the group consisting of hydrogen and methyl; Rw and Rx when taken jointly represent =$CH_2$; and Rz is a member selected from the group consisting of hydrogen and an alkyl group having up to 4 carbon atoms, said copolymer consisting of polymerized —$CH_2CH_2$— units from said ethylene and polymerized divalent bicycloheptanylene units of the general formula:

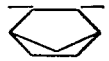

from the bicyclo[2.2.1]hept-2-ene compound in the polymer chain.

83. A copolymer of ethylene and a bicyclo compound of the formula

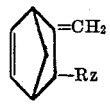

wherein Rz is a member selected from the group consisting of hydrogen and an alkyl group having up to 4 carbon atoms, said copolymer consisting of polymerized —$CH_2CH_2$— units from said ethylene and polymerized divalent bicycloheptanylene units of the general formula:

from the bicyclo[2.2.1]hept-2-ene compound in the polymer chain.

84. A copolymer of ethylene and a bicyclo compound of the formula

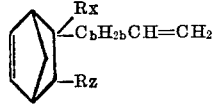

wherein Rx and Rz are each members selected from the group consisting of a hydrogen atom and an alkyl group having up to 4 carbon atoms and $b$ is an integer having a value of from 0 to 4, said copolymer consisting of polymerized —$CH_2CH_2$— units from said ethylene and polymerized divalent bicycloheptanylen units of the general formula:

from the bicyclo[2.2.1]hept-2-ene compound in the polymer chain.

85. A copolymer of ethylene and a bicyclo compound of the formula

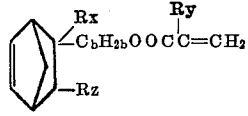

where in Rx and Rz are each members selected from the group consisting of a hydrogen atom and an alkyl group having up to 4 carbon atoms; $b$ is an integer having a value of from 0 to 4; and Ry is a member selected from the group consisting of hydrogen and methyl, said copolymer consisting of polymerized —$CH_2CH_2$— units from said ethylene and polymerized divalent bicycloheptanylene units of the general formula:

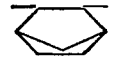

from the bicyclo[2.2.1]hept-2-ene compound in the polymer chain.

86. A copolymer of ethylene and 5-methylenebicyclo-[2.2.1]hept-2-ene, said copolymer consisting of polymerized —$CH_2CH_2$— units from said ethylene and polymerized divalent bicycloheptanylene units of the general formula:

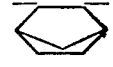

from the bicyclo[2.2.1]hept-2-ene compound in the polymer chain.

87. A copolymer of ethylene and 5-vinylbicyclo[2.2.1]-hept-2-ene, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

88. A copolymer of ethylene and bicyclo[2.2.1]-hept-5-en-2-methyl acrylate, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

89. A copolymer of ethylene and bis(bicyclo[2.2.1]-hept-5-en-2-yl)sulfone, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

90. A copolymer of ethylene and bicyclo[2.2.1]-hept-5-en-2-methyl bicyclo[2.2.1]hept-5-en-2-carboxylate, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

91. A copolymer of ethylene and bis(bicyclo[2.2.1]-hept-5-en-2-methyl)maleate, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

92. A copolymer of ethylene and tetracyclo[6.2.1.1$^{3,6}$.0$^{2,7}$]-4-dodecene said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

93. A copolymer of ethylene and 9-(aminomethyl)-tetracyclo[6.2.1.1$^{3,6}$.0$^{2,7}$]-4-dodecene, said copolymer consisting of polymerized —CH$_2$CH$_2$— units from said ethylene and polymerized divalent bicycloheptanylene units of the general formula:

from the bicyclo[2.2.1]hept-2-ene compound in the polymer chain.

94. A copolymer of ethylene and 3,4,5,6,12,12-hexachlorotetracyclo[6.2.1.1$^{3,6}$.0$^{2,7}$]dodeca-4,9-diene, said copolymer consisting of polymerized —CH$_2$CH$_2$— units from said ethylene and polymerized divalent bicycloheptanylene units of the general formula:

for the bicyclo[2.2.1]hept-2-ene compound in the polymer chain.

95. A copolymer of ethylene and tetracyclo[6.2.1.1$^{3,6}$.0$^{2,7}$]dodeca-4,9-diene said copolymer consisting of polymerized —CH$_2$CH$_2$— units from said ethylene and polymerized divalent bicycloheptanylene units of the general formula:

for the bicyclo[2.2.1]hept-2-ene compound in the polymer chain.

96. A copolymer of 2-hydroxymethyl-5-norbornene and ethylene in which the weight content of 2-hydroxymethyl-5-norbornene units is within the range of about 10 to 25% by weight.

97. A polymer of ethylene and a bicyclo[2.2.1]hept-2-ene which is substituted in the 5-position with an unsaturated hydrocarbon radical having from 1 to 2 carbon atoms, said polymer having said bicyclo[2.2.1]hept-2-ene present in divalent bicycloheptanylene units of the formula:

in the polymer chain.

References Cited

UNITED STATES PATENTS

| | | | |
|---|---|---|---|
| 2,799,668 | 7/1957 | Anderson et al. | 260—88.2 |
| 2,930,782 | 3/1960 | Schmerling | 260—88.2 |
| 2,932,630 | 4/1960 | Robinson et al. | 260—93.1 |
| 2,985,611 | 5/1961 | Gaylord et al. | 260—30.8 |
| 3,222,330 | 12/1965 | Nyce et al. | 260—80.77 |

JOSEPH L. SCHOFER, Primary Examiner

J. KIGHT, Assistant Examiner

U.S. Cl. X.R.

260—78, 79.3, 79.7, 82.1, 85.7, 86.1, 86.7, 87.3, 78.5, 88.1, 88.2

UNITED STATES PATENT OFFICE
CERTIFICATE OF CORRECTION

Patent No. 3,494,897　　　　Dated December 5, 1963

Inventor(s) F. P. Reding et al.　　　　PAGE 1

It is certified that error appears in the above-identified patent and that said Letters Patent are hereby corrected as shown below:

Column 3, line 13, the formula -OR"" should read -- -OOCR'' --; line 47, correct the spelling of --intention--; lines 50-51, correct the spelling of --compounds--; lines 62 to 68, the formulas

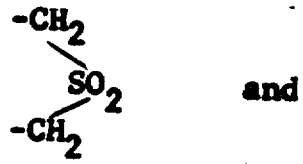　　and　　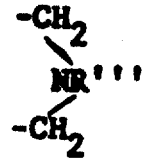

should read

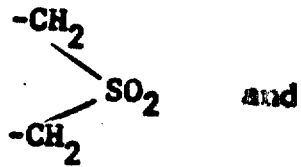　　and　　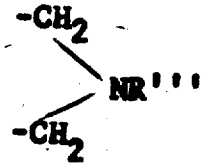

Column 7, line 25, "or" should read --are--.

Column 8, lines 36 to 40, the formula should read

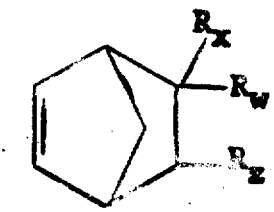

Column 10, line 37, correct the spelling of --practically--.

Column 15, lines 66 to 70, the formula should read

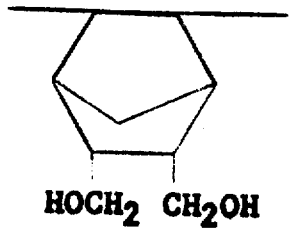

Column 18, line 45, "carboxycyclo" should read --carboxybicyclo--.

Column 21, line 48, "2,33" should read --2,3--.

Column 27, lines 65-69, the formula should read

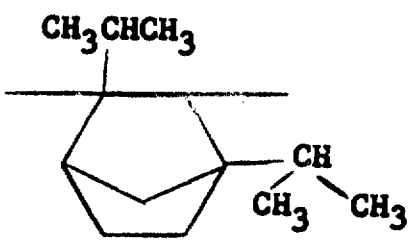

Column 44, line 12, after "consisting of" the term --polymerized -CH$_2$CH$_2$- units and-- is to be inserted.

SIGNED AND SEALED
JUL 28 1970

(SEAL)
Attest:

Edward M. Fletcher, Jr.
Attesting Officer

WILLIAM E. SCHUYLER, JR.
Commissioner of Patents